United States Patent
Son et al.

(10) Patent No.: US 10,645,211 B2
(45) Date of Patent: May 5, 2020

(54) TEXT INPUT METHOD AND ELECTRONIC DEVICE SUPPORTING THE SAME

(71) Applicant: Samsung Electronics Co., Ltd., Suwon-si, Gyeonggi-do (KR)

(72) Inventors: Ki Hyoung Son, Yongin-si (KR); Giang Yoon Kwon, Seoul (KR); Hyun Yeul Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 15/813,783

(22) Filed: Nov. 15, 2017

(65) Prior Publication Data

US 2018/0152554 A1    May 31, 2018

(30) Foreign Application Priority Data

Nov. 30, 2016   (KR) ........................ 10-2016-0161656

(51) Int. Cl.
```
G06F 3/0488      (2013.01)
H04M 1/725       (2006.01)
G06F 9/54        (2006.01)
G06F 3/0484      (2013.01)
G06F 17/24       (2006.01)
```
(52) U.S. Cl.
CPC .... *H04M 1/72552* (2013.01); *G06F 3/04842* (2013.01); *G06F 3/04886* (2013.01); *G06F 9/543* (2013.01); *G06F 17/243* (2013.01)

(58) Field of Classification Search
CPC .... G06F 3/04842; G06F 3/0488; G06F 17/24; G06F 17/243; G06F 3/04886
See application file for complete search history.

(56) References Cited

U.S. PATENT DOCUMENTS

| | | | |
|---|---|---|---|
| 8,555,186 | B2 | 10/2013 | Sahai et al. |
| 9,098,597 | B2 | 8/2015 | Matas et al. |
| 9,170,714 | B2 | 10/2015 | Wilhelm Martens et al. |
| 2007/0106952 | A1 | 5/2007 | Matas et al. |
| 2009/0044140 | A1 | 2/2009 | Chen et al. |
| 2011/0185314 | A1 | 7/2011 | Sahai et al. |
| 2014/0123045 | A1 | 5/2014 | Wilhelm Martens et al. |
| 2015/0067609 | A1 | 3/2015 | Moon et al. |

FOREIGN PATENT DOCUMENTS

KR    10-2015-0024526 A    3/2015

*Primary Examiner* — Andrea C Leggett
(74) *Attorney, Agent, or Firm* — Jefferson IP Law, LLP

(57) ABSTRACT

An electronic device is provided. The electronic device includes an input interface, a memory, a display, and a processor. The processor is configured to extract a text string from a first view object included in the first screen if a first screen output to the display is deactivated, store the extracted text string in the memory, output the text string stored in the memory to a first area of the second screen if a first user input for inputting a text in a second screen output to the display is generated, select at least one text character of the text string in response to a second user input generated in the first area, and output the selected at least one text character to a second area of the second screen different from the first area.

23 Claims, 16 Drawing Sheets

TEXT INPUT METHOD AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Nov. 30, 2016 in the Korean Intellectual Property Office and assigned Serial number 10-2016-0161656, the entire disclosure of which is hereby incorporated by reference.

TECHNICAL FIELD

The present disclosure relates to a text input method and an electronic device supporting the same.

BACKGROUND

An electronic device such as a smartphone may provide a function to identically or similarly input a text output to a screen. For example, the electronic device may copy a text output to a first screen to a clip board and may paste the text copied to the clip board in a text input area of a second screen.

The above information is presented as background information only to assist with an understanding of the present disclosure. No determination has been made, and no assertion is made, as to whether any of the above might be applicable as prior art with regard to the present disclosure.

SUMMARY

However, an electronic device according to the related art needs to receive a separate user input corresponding to a function to copy a text from a user for the purpose of copying a text output to a screen. In addition, in the case of the screen, for example, a notification screen or the like, that is temporarily output to the display and then disappears, the electronic device according to the related art requires a user to rapidly enter an input or needs to execute an application that manages a notification, for the purpose of copying a text output to the notification screen.

Aspects of the present disclosure are to address at least the above-mentioned problems and/or disadvantages and to provide at least the advantages described below. Accordingly, an aspect of the present disclosure is to provide a text input method that stores a text output to the screen in a memory without a separate user input corresponding to the function to copy a text and inputs a text by using the stored text, and an electronic device supporting the same.

In accordance with an aspect of the present disclosure, an electronic device is provided. The electronic device includes an input interface configured to receive a user input, a memory configured to store an application, a display configured to display an execution screen of the application, and a processor operatively connected with the input interface, the memory, and the display. The processor is configured to extract a text string from a first view object included in the first screen if a first screen output to the display is deactivated, store the extracted text string in the memory, output the text string stored in the memory to a first area of the second screen if a first user input for inputting a text in a second screen output to the display is generated, select at least one text character of the text string in response to a second user input generated in the first area, and output the selected at least one text character to a second area of the second screen different from the first area.

In accordance with another aspect of the present disclosure, a text input method of an electronic device is provided. The method includes extracting a text string from a first view object included in the first screen if a first screen output to a display is deactivated, storing the extracted text string in a memory, outputting the text string stored in the memory to a first area of the second screen if a first user input for inputting a text in a second screen output to the display is generated, selecting at least one text character of the text string in response to a second user input generated in the first area, and outputting the selected at least one text character to a second area of the second screen different from the first area.

According to various embodiments of the present disclosure, a text output to a screen may be stored in a memory without a separate user input corresponding to the function to copy a text, thereby providing a text input method that easily uses the text output to the previous screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
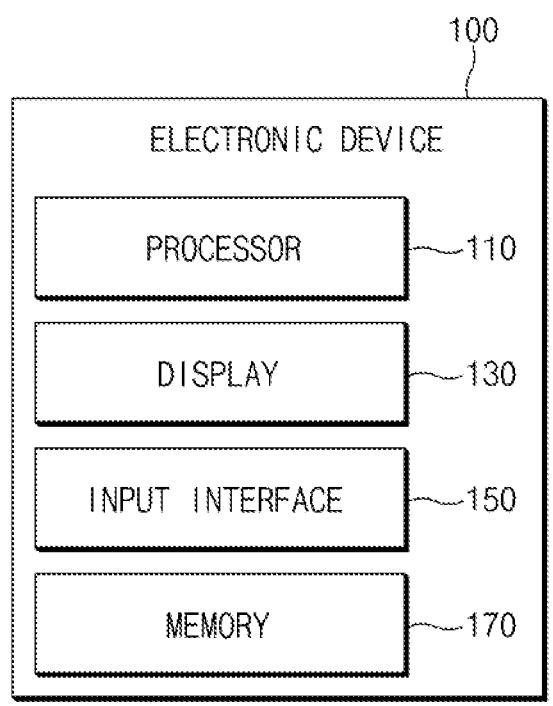
FIG. 1 is a block diagram of an electronic device associated with a text input, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram of an electronic device associated with a text input, according to an embodiment of the present disclosure.

An electronic device 100 may provide a function to input a text, which is output to the screen of a display 130, to another screen identically or similarly. For example, if a first screen is deactivated (e.g., if the output of the first screen ends or if focusing is changed from the first screen to another screen), the electronic device 100 may store a text string associated with a view object output to the first screen in a memory 170. In addition, if a first user input for inputting a text in a second screen the same as or different from the first screen is generated, the electronic device 100 may output the text string stored in the memory 170 to a specific area of the second screen. Afterwards, the electronic device 100 may select or deselect at least one character of the text string output to the specific area of the second screen in response to a second user input generated in the second screen, and may output the selected at least one character to another area of the second screen in response to a third user input.

Referring to FIG. 1, the electronic device 100 performing the above-described function may include a processor 110, the display 130, an input interface 150, and the memory 170. However, a configuration of the electronic device 100 is not limited thereto. According to various embodiments, the electronic device 100 may further include at least another element in addition to the aforementioned elements.

The processor 110 may perform data processing or an operation associated with control and/or communication of at least one other element(s) of the electronic device 100. The processor 110 may load and process an instruction or data, which is received from at least one of other components (e.g., a nonvolatile memory) in a volatile memory, and may store a variety of data at a nonvolatile memory. For example, the processor 110 may load an instruction or data associated with a text input stored in the memory 170 to the volatile memory and may process the instruction or the data depending on a specified program routine.

According to an embodiment, the processor 110 may execute an application stored in the memory 170 and may output the execution screen of the application to the display 130. For example, the processor 110 may constitute contexts (e.g., a text, an image, a video, an icon, and/or a symbol) associated with the application in a screen and may output the screen to the display 130.

According to an embodiment, if the first screen is deactivated, the processor 110 may extract a text string from a view object (e.g., contexts) output to the first screen. For example, the processor 110 may obtain a view property of the view object. If the view property is a text property, the processor 110 may extract the view object itself as a text string. For another example, if the view property is an image, the processor 110 may extract the text string from the view object through an optical character recognition (OCR) function. For another example, if the view property is a hypertext created through a web document language such as HTML or the like, the processor 110 may parse a corresponding web document to extract the text string. In an embodiment, even though the text string is extractable from the view object, the processor 110 may not extract the text string if the view object is included in a system area, for example, a button, a title bar, a menu, or the like.

According to an embodiment, the processor 110 may extract the text string from view objects output to a plurality of screens. For example, the processor 110 may extract the text string from the second screen, which is output to the display 130 before the output of the first screen, as well as the first screen. For example, after any one screen is output, if the corresponding screen is deactivated, the processor 110 may extract the text string from the view object output to the corresponding screen and may control the memory 170 so as to keep a state where the extracted text string is stored before a specified condition is satisfied. For example, the specified condition may include the case where a specified time elapses after the corresponding screen is deactivated, the case where an application associated with the corresponding screen ends, the case where data associated with the execution of the application is deleted from the memory 170 after the application ends (e.g., the case where the corresponding application is deleted from a history list of the applications), or the like.

According to an embodiment, the processor 110 may store the extracted text string in the memory 170. In an embodiment, the processor 110 may correlate the extracted text string with the property of the first screen from which the text string is extracted, and may store the correlated result in the memory 170. For example, the processor 110 may correlate a first text string extracted from the view object of the first screen with the property of the first screen and may store the correlated result in the memory 170. In addition, the processor 110 may correlate a second text string extracted from the view object of the second screen with the property of the second screen and may store the correlated result in the memory 170.

According to an embodiment, if the first user input for inputting a text in a third screen, which is different from the first screen or the second screen, is generated, the processor 110 may output a text string (e.g., the first text string associated with the first screen, the second text string associated with the second screen, or the like) stored in the memory 170 to a specific area of the third screen. In an embodiment, the processor 110 may output a soft input panel (SIP) for inputting a text in the specific area of the display 130 in response to the first user input, and may output the text string stored in the memory 170 to a specific area of the third screen in response to a selection input of a specified button included in the SIP. In this case, the processor 110 may end the output of the SIP in response to the selection input of the specified button and may output the text string to an area to which the SIP has been output.

According to an embodiment, the processor 110 may select or deselect at least one character of the text string output to the specific area of the third screen in response to the second user input generated in the specific area of the third screen. For example, if a tap input or the like is generated in the specific area of the third screen, the processor 110 may set a character corresponding to the tap input to the selected character or may exclude a character from the selected character in the case where the character is already selected. In an embodiment, the processor 110 may select and deselect the character in units of words upon the selection and deselection of the character. In this case, the processor 110 may distinguish a word based on a delimiter (e.g., a blank character) included in the text string.

According to an embodiment, the processor 110 may output at least one character selected from the text string to the specific area of the third screen in response to a third user input generated in the third screen. The processor 110 may output the selected at least one character to an area different from an area to which the text string is output. For example, the processor 110 may output the selected at least one character to a location at which the first user input is generated. For example, in the case where the first user input is an input for selecting a text field object, the processor 110 may output the selected at least one character to the text field object. For another example, the processor 110 may output the selected at least one character to a text input area of the SIP.

According to an embodiment, the processor 110 may delete the text string stored in the memory 170. For example, if the specified condition occurs, the processor 110 may delete the text string stored in the memory 170. For example, if a specified time elapses after the first screen (or the second screen) ends, the processor 110 may delete the text string associated with the first screen (or the second screen) from the memory 170. For another example, if an application associated with the first screen (or the second screen) ends, the processor 110 may delete the text string associated with the first screen (or the second screen) from the memory 170. For another example, in the case where data associated with the execution of the application is deleted from the memory 170 after the application associated with the first screen (or the second screen) ends, the processor 110 may delete the text string associated with the first screen (or the second screen) from the memory 170.

The display 130 may display various types of contexts to a user. For example, the display 130 may display the execution screen of the application stored in the memory 170.

According to an embodiment, if at least one character of the text string output to a screen is selected by a user input, the display 130 may display the selected at least one character to be different from another unselected character. For example, the display 130 may display a shape (or a font), a size, a color, a background color, or the like of the selected at least one character to be different from that of another unselected character.

The input interface 150 may receive an input from the user. According to an embodiment, the input interface 150 may include a touch panel that is stacked on the display 130 such as a touchscreen or the like or is integrated with the display 130. For another example, the input interface 150 may include a physical key (e.g., a physical button, an optical key, a keypad, or the like) disposed in the housing of the electronic device 100.

The memory 170 may store instructions or data associated with at least one other component(s) of the electronic device 100. For example, the memory 170 may store software and/or a program. For example, the memory 170 may store an application capable of being executed by the electronic device 100. For another example, if the application is executed, the memory 170 may store the data associated with the execution of the application.

According to an embodiment, the memory 170 may store the text string extracted from the view object output to the screen. For example, if any one screen is deactivated, the memory 170 may store the text string extracted from the view object output to the corresponding screen.

As described above, according to various embodiments, an electronic device (e.g., the electronic device 100) may include an input interface (e.g., the input interface 150) configured to receive a user input, a memory (e.g., the memory 170) configured to store an application, a display (e.g., the display 130) configured to display an execution screen of the application, and a processor (e.g., the processor 110) operatively connected with the input interface, the memory, and the display. The processor may be configured to extract a text string from a first view object included in the first screen if a first screen output to the display is deactivated, store the extracted text string in the memory, output the text string stored in the memory to a first area of the second screen if a first user input for inputting a text in a second screen output to the display is generated, select at least one text character of the text string in response to a second user input generated in the first area, and output the selected at least one text character to a second area of the second screen different from the first area.

According to various embodiments, as a part of an operation of extracting the text string, the processor may be configured to obtain a view property of the first view object, and extract the text string from the first view object based on the view property.

According to various embodiments, the processor may be configured to output a soft input panel for inputting text to a third area of the second screen in response to the first user input, instead of outputting the text string.

According to various embodiments, the processor may be configured to end an output of the soft input panel if a specified button included in the soft input panel is selected, and output the text string to the third area.

According to various embodiments, the processor may be configured to end an output of the soft input panel if a specified button included in the soft input panel is selected, and output an execution screen of an application including a second view object corresponding to the text string to the third area.

According to various embodiments, the processor may be configured to extract the text string from the second view object if the second view object is selected, end the execution screen of the application including the second view object, and output the extracted text string to the third area.

According to various embodiments, as a part of an operation of outputting the selected at least one text character, the processor may be configured to output the selected at least one text character in response to a third user input.

According to various embodiments, if a specified time elapses after the first screen is deactivated, if an application associated with the first screen ends, or if data associated with an execution of the application associated with the first screen is deleted from the memory after the application associated with the first screen ends, the processor may be configured to delete the text string from the memory.

According to various embodiments, as a part of an operation of outputting the selected at least one text character, the processor may be configured to output at least one of a shape, a size, a color, or a background color of the selected at least one text character to be different from a shape, a size, a color, or a background color of another unselected text character.

According to various embodiments, in a state where the at least one text character of the text string is selected, the processor may be configured to deselect the selected at least one text character in response to a third user input generated in the first area, and end an output of the deselected at least one text character in the second area.

Figure 2:
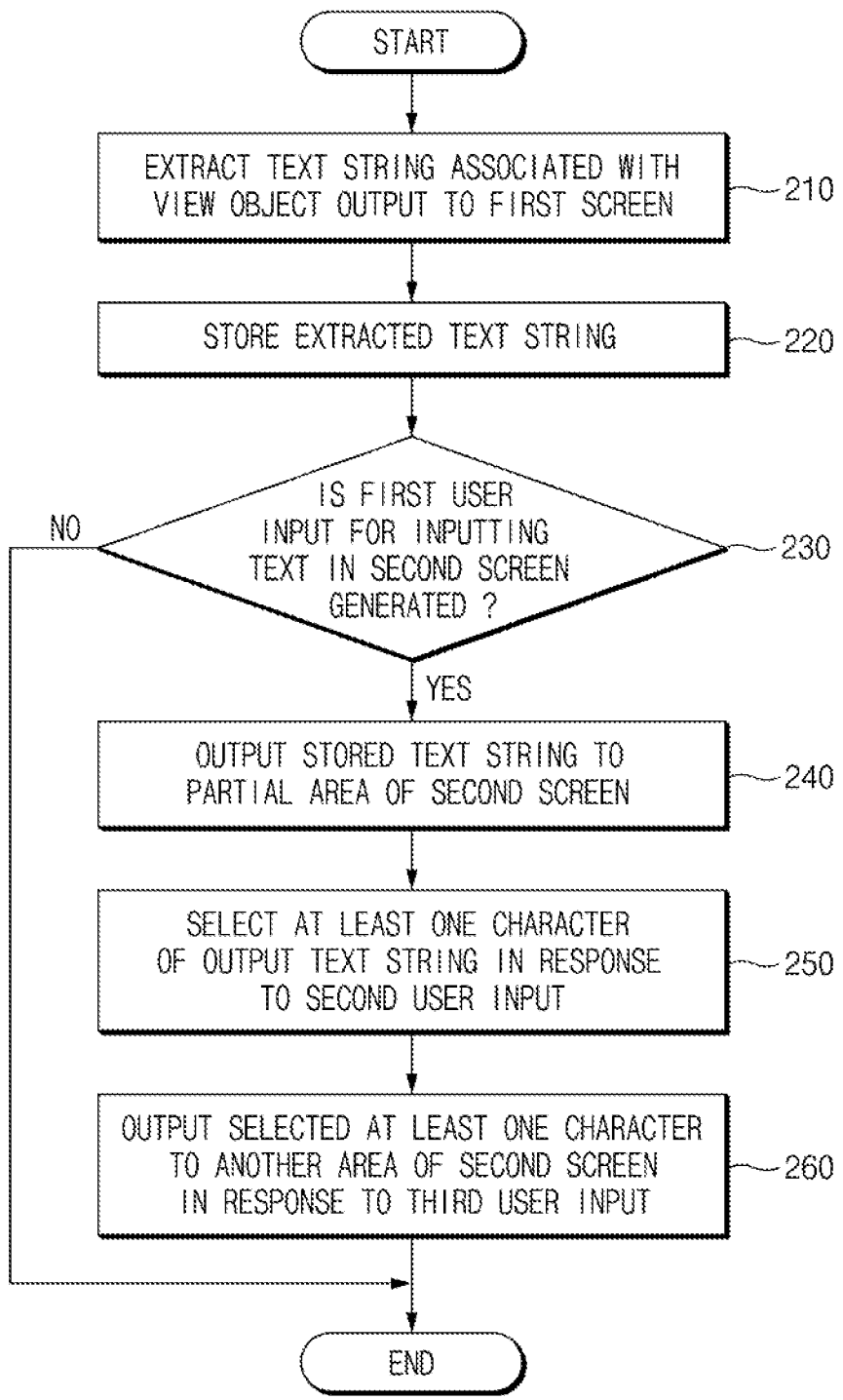
FIG. 2 is flowchart illustrating an operating method of an electronic device associated with a text input, according to an embodiment of the present disclosure.

FIG. 2 is flowchart illustrating an operating method of an electronic device associated with a text input, according to an embodiment of the present disclosure.

If any one screen is deactivated (e.g., if the output of the corresponding screen ends or if focusing is changed from the corresponding screen to another screen), an electronic device (e.g., the electronic device 100) may support a text input method so as to input a text string associated with a view object output to the corresponding screen to another screen.

Referring to FIG. 2, if a first screen is deactivated, in operation 210, the electronic device may extract a text string associated with a view object output to the first screen. According to an embodiment, the electronic device may obtain a view property of the view object output to the first screen and may extract the text string from the view object depending on the view property in a specified manner. For example, if the view property is a text property, the electronic device may extract the text string from the view object. For another example, if the view property is an image, the electronic device may extract the text string from the view object through an OCR function. For another example, if the view property is a hypertext, the electronic device may parse the corresponding web document to extract the text string. In an embodiment, even though the text string is extractable from the view object, the electronic device may not extract the text string if the view object is included in a system area, for example, a button, a title bar, a menu, or the like.

In operation 220, the electronic device may store the extracted text string in a memory (e.g., the memory 170). According to an embodiment, the electronic device may correlate the extracted text string with the property of the first screen from which the text string is extracted, and may store the correlated result in the memory.

In operation 230, the electronic device may determine whether a first user input for inputting a text in a second screen is generated. The second screen may be a screen the same as or different from the first screen. For example, the second screen may be a screen that is activated after the first screen is deactivated. According to an embodiment, the electronic device may determine whether a user selects a text input object (e.g., a text field object) output to the second screen through an input interface (e.g., the input interface 150).

If the first user input is generated, in operation 240, the electronic device may output the text string stored in the memory to a partial area of the second screen. For example, the electronic device may output the text string to a lower area of the second screen. In an embodiment, the electronic device may output an SIP for inputting a text to the lower area of the second screen, in response to the first user input and may output the text string to a partial area of the second screen in response to a selection input of a specified button included in the SIP. In this case, the electronic device may end the output of the SIP in response to the selection input of the specified button and may output the text string to an area to which the SIP has been output.

In operation 250, if a second user input is generated in the partial area of the second screen, the electronic device may select at least one character of the text string output to the partial area of the second screen. For example, if a tap input is generated in an area to which the text string is output, the electronic device may set a character corresponding to the tap input as the selected character. In an embodiment, if an input for tapping a character, which is already selected, of the text string output to the partial area of the second screen is generated, the electronic device may deselect the selected character. According to an embodiment, the selection and the deselection of the character may be processed in units of words divided based on a delimiter included in the text string.

In operation 260, if a third user input is generated in the second screen, the electronic device may output the selected at least one character to another area of the second screen. For example, the electronic device may output the selected at least one character to a location at which the first user input is generated. For example, in the case where the first user input is an input for selecting the text input object, the electronic device may output the selected at least one character to the text input object. For another example, the electronic device may output the selected at least one character to a text input area of the SIP.

As described above, according to various embodiments, a text input method of an electronic device may include extracting a text string from a first view object included in the first screen if a first screen output to a display is deactivated, storing the extracted text string in a memory, outputting the text string stored in the memory to a first area of the second screen if a first user input for inputting a text in a second screen output to the display is generated, selecting at least one text character of the text string in response to a second user input generated in the first area, and outputting the selected at least one text character to a second area of the second screen different from the first area.

According to various embodiments, the extracting of the text string may include obtaining a view property of the first view object, and extracting the text string from the first view object based on the view property.

According to various embodiments, the method may further include outputting a soft input panel for inputting text to a third area of the second screen in response to the first user input, instead of outputting the text string.

According to various embodiments, the method may further include ending an output of the soft input panel if a specified button included in the soft input panel is selected, and outputting the text string to the third area.

According to various embodiments, the method may further include ending an output of the soft input panel if a specified button included in the soft input panel is selected, and outputting an execution screen of an application including a second view object corresponding to the text string to the third area.

According to various embodiments, the method may further include extracting the text string from the second view object if the second view object is selected, ending the execution screen of the application including the second view object, and outputting the extracted text string to the third area.

According to various embodiments, the outputting of the selected at least one text character to the second area may include outputting the selected at least one text character in response to a third user input.

According to various embodiments, if a specified time elapses after the first screen is deactivated, if an application associated with the first screen ends, or if data associated with an execution of the application associated with the first screen is deleted from the memory after the application associated with the first screen ends, the method may further include deleting the text string from the memory.

According to various embodiments, the outputting of the selected at least one text character to the second area may include outputting at least one of a shape, a size, a color, or a background color of the selected at least one text character to be different from a shape, a size, a color, or a background color of another unselected text character.

According to various embodiments, the method may further include deselecting the selected at least one text character in response to a third user input generated in the first area in a state where the at least one text character of the text string is selected, and ending an output of the deselected at least one text character in the second area.

Figure 3:
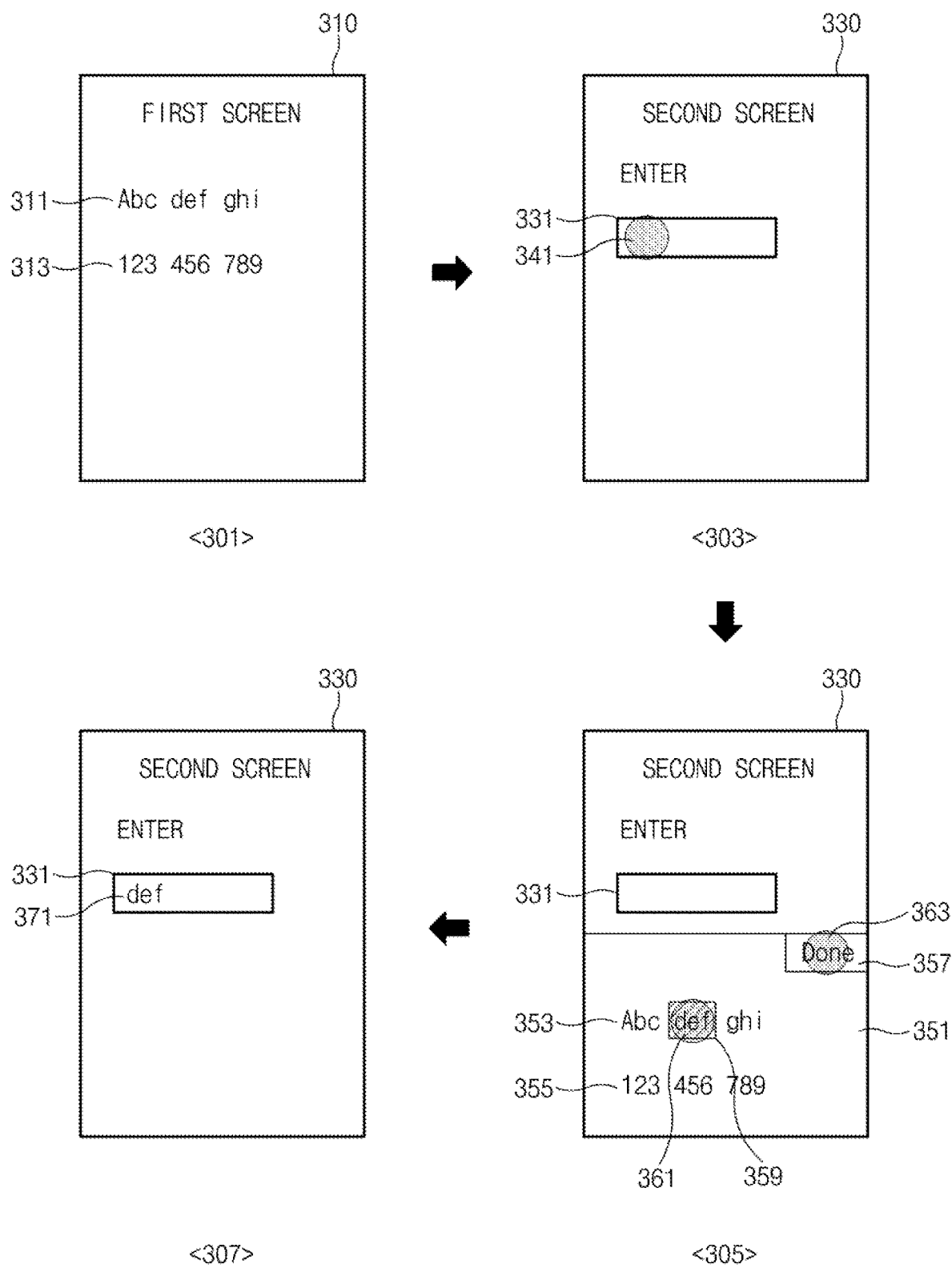
FIG. 3 is a screen view for describing a text input method, according to an embodiment of the present disclosure.

FIG. 3 is a screen view for describing a text input method, according to an embodiment of the present disclosure.

Referring to FIG. 3, as illustrated in a first state 301, the electronic device (e.g., the electronic device 100) may output a first screen 310 in a display (e.g., the display 130). For example, the first screen 310 may be an execution screen of an application stored in a memory (e.g., the memory 170). According to an embodiment, the first screen 310 may include at least one view object. An embodiment is exemplified in FIG. 3 as a first view object 311 and a second view object 313 are included in the first screen 310.

According to an embodiment, if the first screen 310 is deactivated (e.g., if the output of the first screen 310 ends or if focusing is changed from the first screen 310 to a second screen 330), the electronic device may extract a text string from the view object output to the first screen 310. For example, the electronic device may extract a first text string (e.g., "Abc def ghi") from the first view object 311 output to the first screen 310 and may extract a second text string (e.g., "123 456 789") from the second view object 313. In addition, the electronic device may store the extracted text string in the memory.

According to an embodiment, as illustrated in a second state 303, the electronic device may output the second screen 330 to the display. The second screen 330 may be a screen the same as or different from the first screen 310. According to an embodiment, the second screen 330 may be an execution screen of an application different from an application associated with the first screen 310. According to an embodiment, the second screen 330 may include at least one text input object 331. An embodiment is exemplified in FIG. 3 as a text field object is output to the second screen 330 as the text input object 331.

According to an embodiment, if a first user input 341 for inputting a text in the second screen 330 is generated (e.g., if the first user input 341 for selecting the text field object as the text input object 331), as illustrated in a third state 305, the electronic device may output a text string stored in the memory to a specific area of the second screen 330. An embodiment is exemplified in FIG. 3 as the electronic device outputs a first text string 353 and a second text string 355 stored in the memory to a lower area 351 of the second screen 330. In an embodiment, the electronic device may further output an object (e.g., a completion button 357) indicating the completion of character selection to the lower area 351 of the second screen 330.

According to an embodiment, if a second user input 361 is generated in an area (e.g., the lower area 351 of the second screen 330), to which the text string is output, of the second screen 330, the electronic device may select at least one character of the text string. For example, if the input 361 for tapping one character of the text string is generated, the electronic device may set a character corresponding to the tap input 361 as the selected character. In this case, the electronic device may select a character in units of words divided based on a delimiter included in the text string. For example, as illustrated in FIG. 3, the electronic device may divide the first text string 353 into a plurality of words (e.g., "Abc", "def", and "ghi") based on a blank character and may set one word 359 (e.g., "def"), which corresponds to the tap input 361, of the plurality of words as the selected character. FIG. 3 illustrates the state where only one word 359 is selected. However, various embodiments may not be limited thereto. According to various embodiments, before the completion button 357 is selected, the electronic device may further select at least one of the plurality of words included in the text string or may deselect the selected word.

According to an embodiment, if a third user input 363 is generated in the second screen 330, as illustrated in a fourth state 307, the electronic device may output the selected at least one character to another area of the second screen 330. For example, if the user input 363 for selecting the completion button 357 is generated, the electronic device may output the selected at least one character to a location at which the first user input 341 is generated. An embodiment is exemplified in FIG. 3 as the electronic device outputs the selected at least one character 371 (e.g., "def") to the text field object as the text input object 331.

Figure 4:
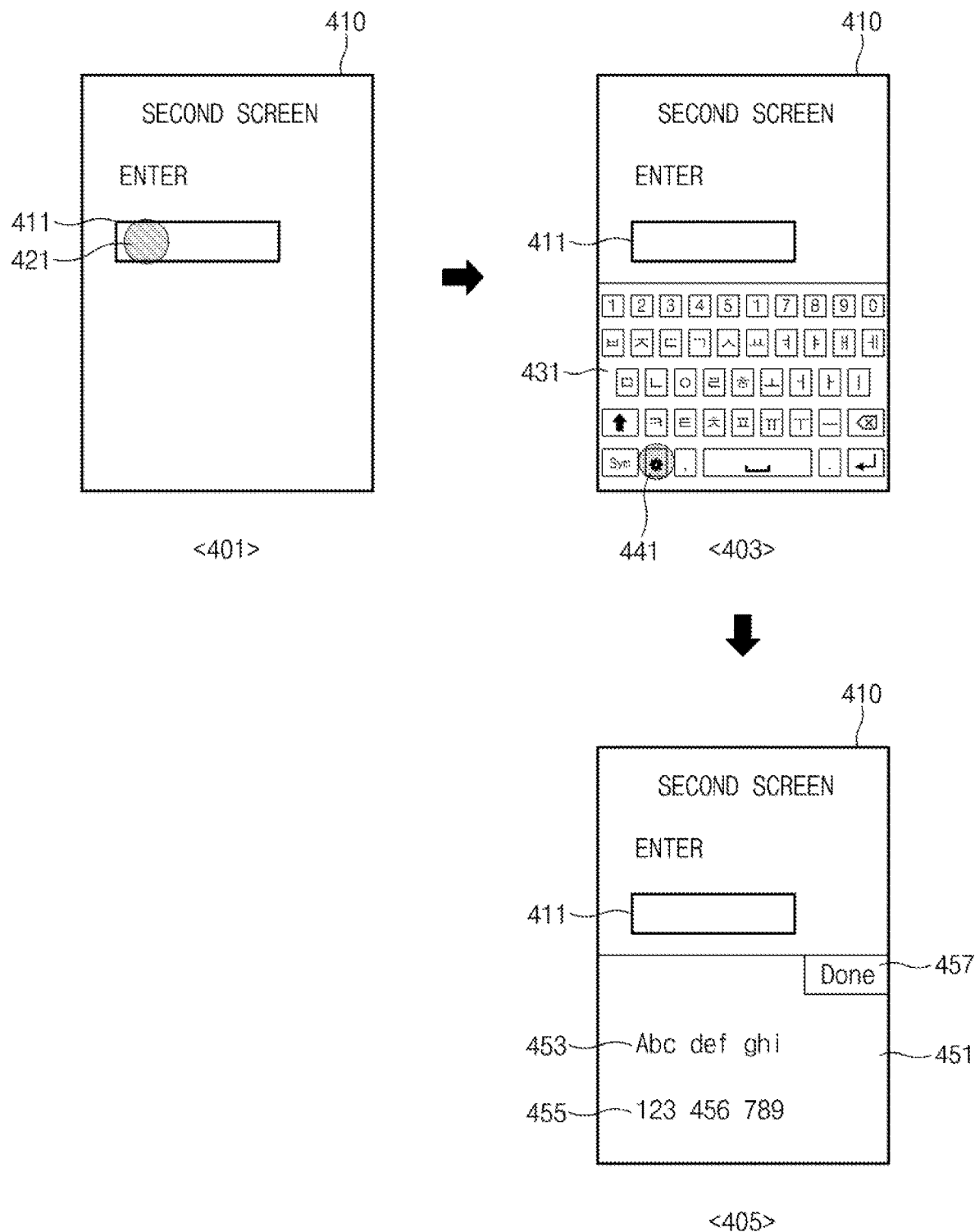
FIG. 4 is a view for describing a method of outputting a text string stored in a memory through a soft input panel (SIP), according to an embodiment of the present disclosure.

FIG. 4 is a view for describing a method of outputting a text string stored in a memory through an SIP, according to an embodiment of the present disclosure.

Referring to FIG. 4, as illustrated in a first state 401, an electronic device (e.g., the electronic device 100) may output a screen 410 (e.g., the second screen 330) including a text input object 411 (e.g., the text input object 331) to a display (e.g., the display 130). According to an embodiment, if a user input 421 (e.g., the first user input 341) for selecting the text input object 411 is generated, the electronic device may output an SIP 431, instead of outputting a text string stored in a memory (e.g., the memory 170) to a specific area of the screen 410. If the SIP 431 is output, a user may input a text through the SIP 431 before utilizing a text string stored in the memory.

According to an embodiment, in a second state 403, if a user input 441 for selecting a specified button included in the SIP 431 is generated, as illustrated in a third state 405, the electronic device may output the text string stored in the memory to the specific area of the screen 410. An embodiment is exemplified in FIG. 4 as the electronic device outputs a first text string 453 and a second text string 455 to a lower area 451 of the screen 410 together with a completion button 457.

Figure 5:
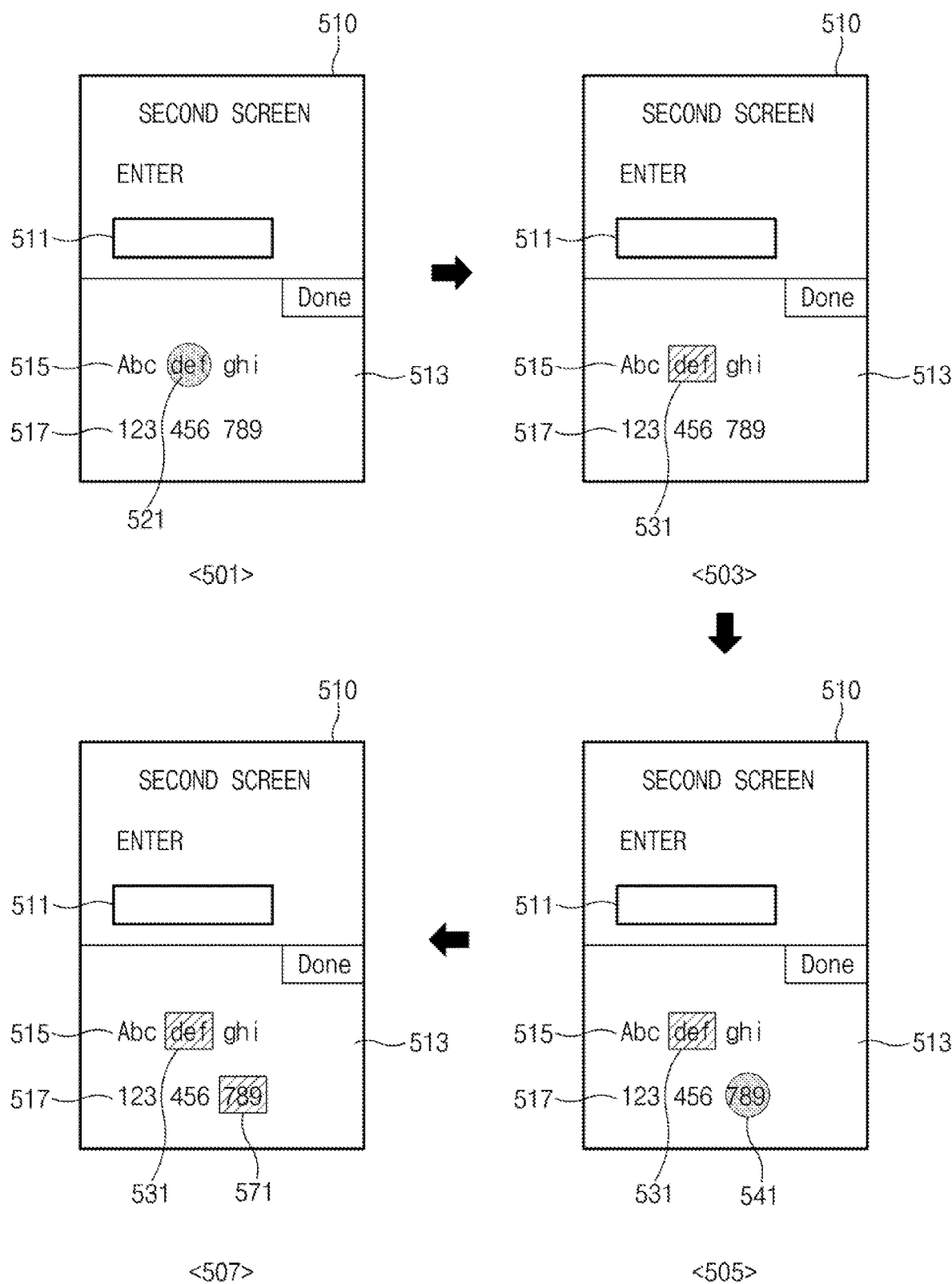
FIG. 5 is a view for describing a method of selecting a part of output text string, according to an embodiment of the present disclosure.

FIG. 5 is a view for describing a method of selecting a part of output text string, according to an embodiment of the present disclosure.

Referring to FIG. 5, as illustrated in a first state 501, the electronic device (e.g., the electronic device 100) may output a screen (e.g., a second screen 510) in a display (e.g., the display 130). According to an embodiment, the screen 510 may be a screen in which a text string (e.g., a first text string 515, a second text string 517, or the like) stored in the memory (e.g., the memory 170) is output to a specific area (e.g., a lower area 513) in response to a first user input for selecting a text input object 511.

According to an embodiment, if a second user input 521 is generated in an area (e.g., the lower area 513), to which the text string is output, of the screen 510, the electronic device may select at least one character of the text string. For example, if the input 521 for tapping one character of the text string is generated, the electronic device may set a character corresponding to the tap input 521 as the selected character. In this case, the electronic device may select a character in units of words divided based on a delimiter included in the text string. An embodiment is exemplified in FIG. 5 as a first word 531 (e.g., "def"), which is output to a location at which a second user input 521 is generated, from among words (e.g., "Abc", "def", and "ghi") included in the first text string 515 is set to the selected character.

According to an embodiment, the electronic device may display the selected character and the unselected character to be different from each other. For example, as illustrated in a second state 503, the electronic device may display a background color of the selected first word 531 to be different from that of any other unselected word.

According to an embodiment, the electronic device may select a plurality of words from words included in the text string. For example, as illustrated in a third state 505, the electronic device may set a word, which is different from the first word 531, as the selected character in response to any other user input 541 generated in a state where the first word 531 is selected. An embodiment is exemplified in FIG. 5 as the second word 571 (e.g., "789") of words (e.g., "123", "456", and "789") included in the second text string 517 is set to the selected character in response to the other user input 541. According to an embodiment, even though a plurality of words are selected, the electronic device may display the selected word and the unselected word to be different from each other. For example, as illustrated in a fourth state 507, the electronic device may display background colors of the selected first word 531 and the selected second word 571 to be different from those of any other unselected word.

Figure 6:
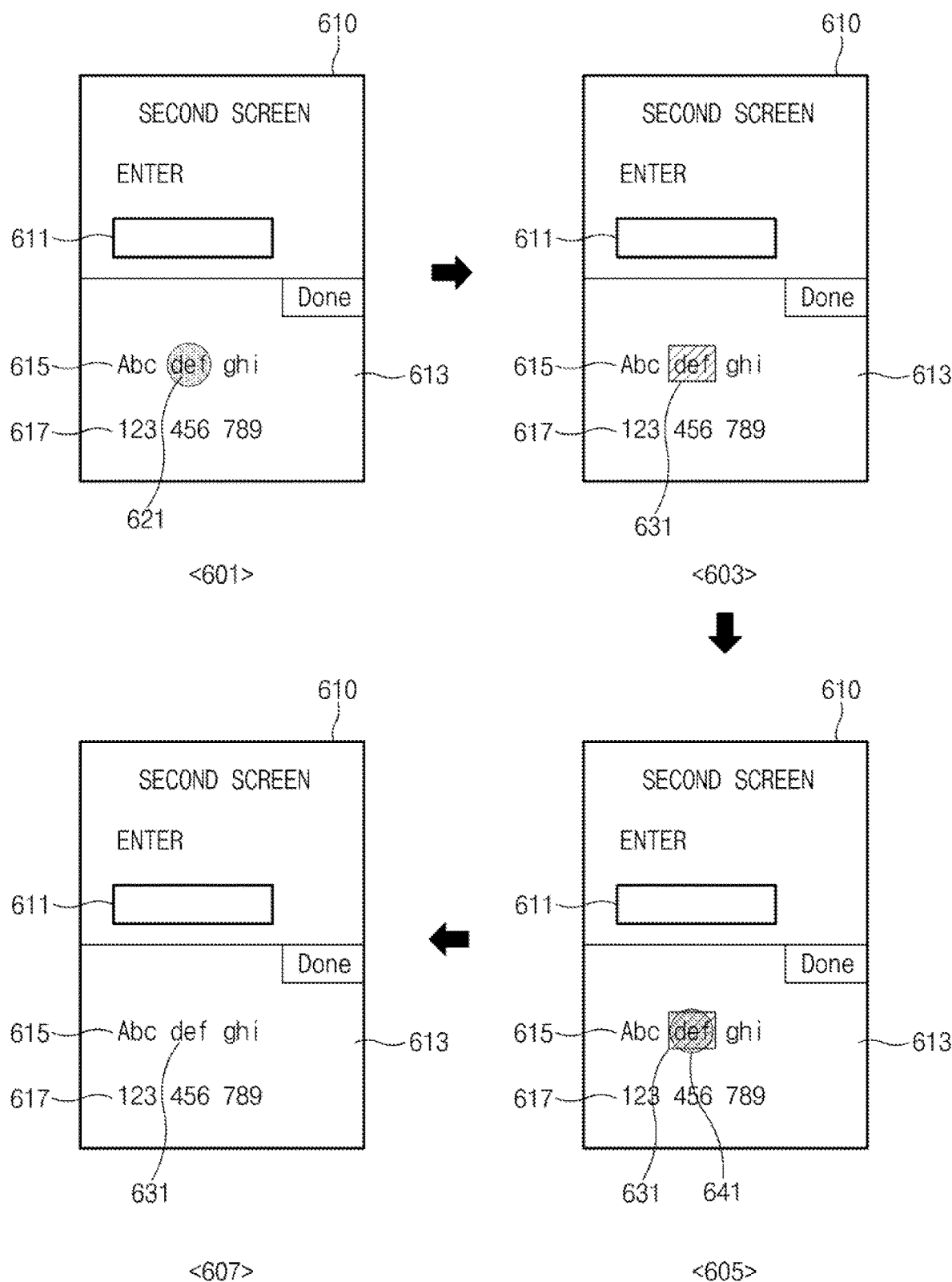
FIG. 6 is a view for describing a method of deselecting a selected character of an output text string, according to an embodiment of the present disclosure.

FIG. 6 is a view for describing a method of deselecting a selected character of an output text string, according to an embodiment of the present disclosure.

Referring to FIG. 6, as illustrated in a first state 601, the electronic device (e.g., the electronic device 100) may output a screen (e.g., a second screen 610) in a display (e.g., the display 130). According to an embodiment, the screen 610 may be a screen in which a text string (e.g., a first text string 615, a second text string 617, or the like) stored in the memory (e.g., the memory 170) is output to a specific area (e.g., a lower area 613) in response to a first user input for selecting a text input object 611.

According to an embodiment, if a second user input 621 is generated in an area (e.g., the lower area 613), to which the text string is output, of the screen 610, the electronic device may select at least one character of the text string. For example, if the input 621 for tapping one character of the text string is generated, the electronic device may set a character corresponding to the tap input 621 as the selected character. In this case, the electronic device may select a character in units of words divided based on a delimiter included in the text string. An embodiment is exemplified in FIG. 6 as a first word 631 (e.g., "def"), which is output to a location at which the second user input 621 is generated, from among words (e.g., "Abc", "def", and "ghi") included in the first text string 615 is set to the selected character.

According to an embodiment, the electronic device may display the selected character and the unselected character to be different from each other. For example, as illustrated in a second state 603, the electronic device may display a background color of the selected first word 631 to be different from that of any other unselected word.

According to an embodiment, the electronic device may deselect the selected character. For example, the electronic device may deselect the selected first word 631. For example, as illustrated in a third state 605, the electronic device may deselect the first word 631 in response to any other user input 641 generated in a state where the first word 631 is selected.

According to an embodiment, in the case where the selected character is deselected, the electronic device may restore a view state of the deselected character to a previous state. For example, as illustrated in a fourth state 607, in the case where the selected first word 631 is deselected, the electronic device may restore a background color of the first word 631 to a previous state.

Figure 7:
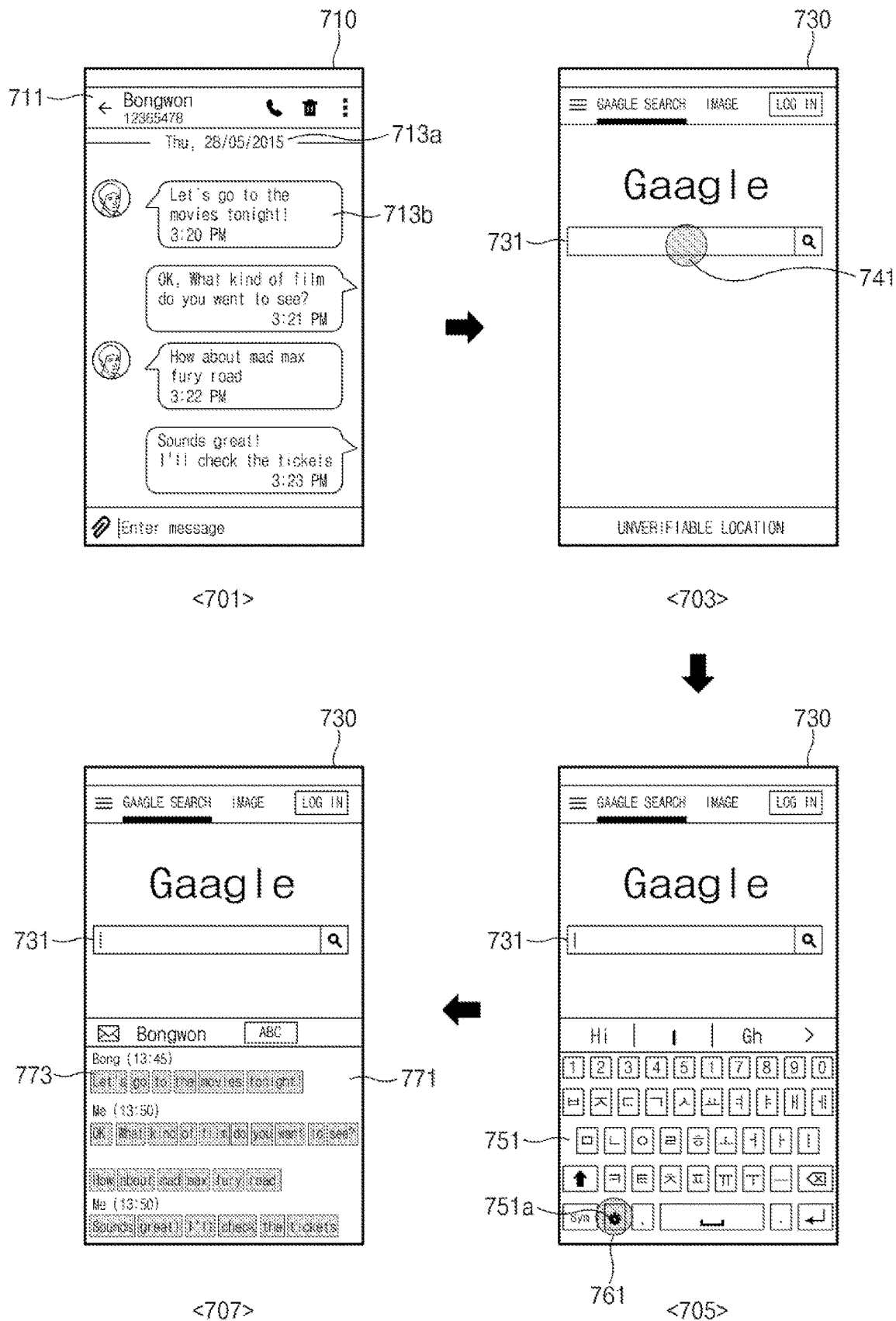
FIGS. 7 and 8 are views for describing a method of inputting a text in a search screen by using a text output to a message screen, according to various embodiment of the present disclosure.
Figure 8:
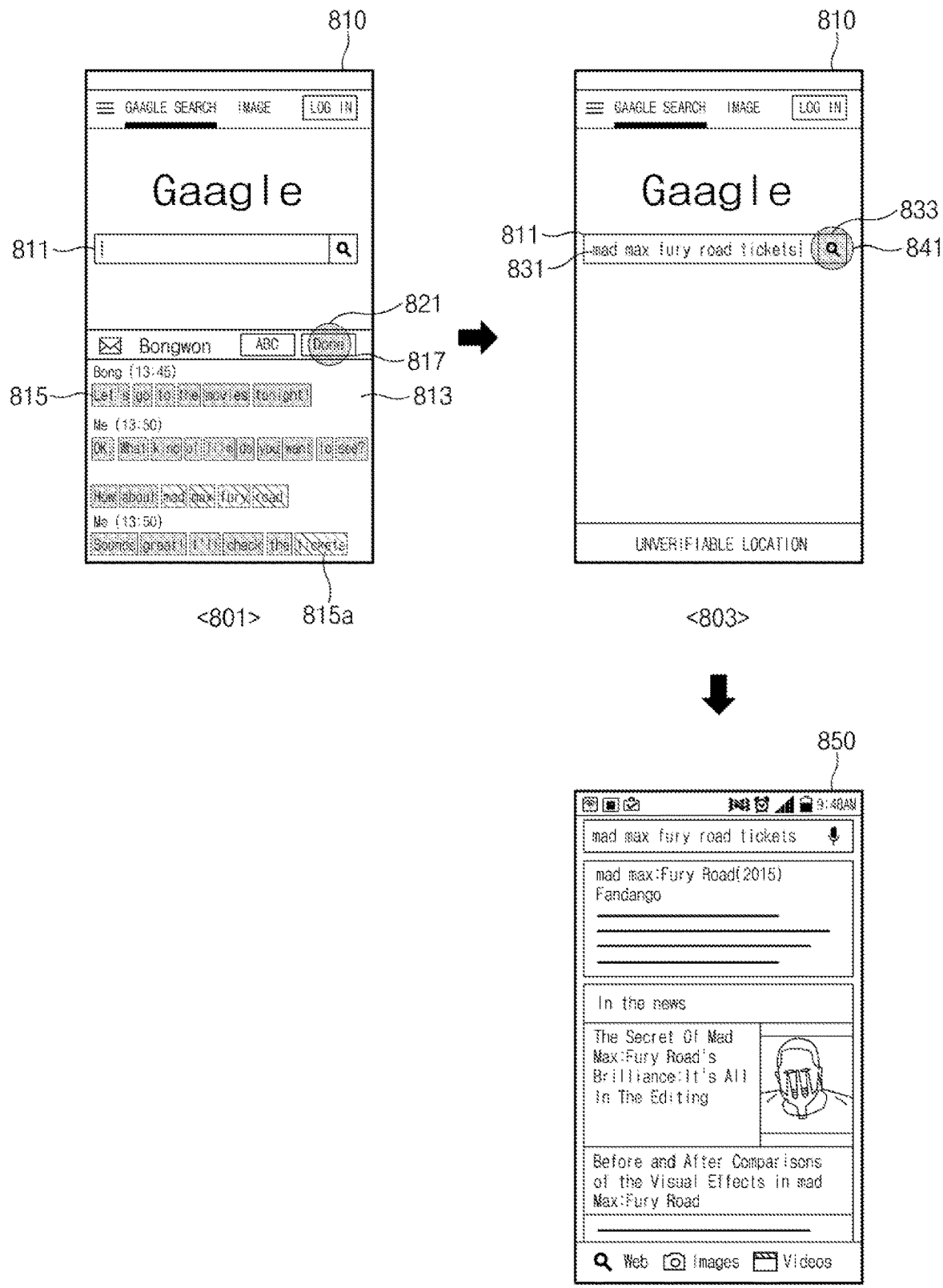

FIGS. 7 and 8 are views for describing a method of inputting a text in a search screen by using a text output to a message screen, according to an embodiment of the present disclosure.

Referring to FIGS. 7 and 8, as illustrated in a first state 701, the electronic device (e.g., the electronic device 100) may output an execution screen 710 of a message application in a display (e.g., the display 130). For example, the execution screen 710 of the message application may include a title bar 711 and a message output area 713. A date 713*a* for sending/receiving a message and a sent/received message 713*b* may be output to the message output area 713. According to an embodiment, a view object corresponding to the title bar 711 and the date 713*a* for sending/receiving a message may be managed as a view object output to a system area. For example, the view object output to the system area may include a button, a title bar, a menu, or the like.

According to an embodiment, if the execution screen 710 of the message application is deactivated, the electronic device may extract a text string from the view object output to the execution screen 710 of the message application. For example, the electronic device may extract the text string from the sent/received message 713*b* output to the message output area 713 in the execution screen 710 of the message application. In an embodiment, the electronic device may not extract the text string from the view object corresponding to the system area. For example, the electronic device may not extract the text string from view objects corresponding to the title bar 711 and the date 713*a* for sending/receiving a message. In addition, the electronic device may store the extracted text string in a memory (e.g., the memory 170).

According to an embodiment, as illustrated in a second state 703, the electronic device may output an execution screen 730 or 810 of a search application to the display. The execution screen 730 or 810 of the search application may include a text input object 731 or 811 (e.g., a text field object) for inputting a search word.

According to an embodiment, if a first user input 741 for selecting the text input object 731 or 811 included in the execution screen 730 or 810 of the search application is generated, as illustrated in a third state 705, the electronic device may output an SIP 751 to a lower area of the execution screen 730 or 810 of a search application. The SIP 751 may include a button 751a for using a text string stored in the memory.

According to an embodiment, if a user input 761 for selecting the specified button 751a included in the SIP 751 is generated, as illustrated in a fourth state 707, the electronic device may end the output of the SIP 751 and may output a text string 773 or 815 stored in the memory to an area 771 or 813, to which the SIP 751 has been output.

According to an embodiment, the electronic device may select at least one character 815a of a text string 773 or 815 in response to a second user input generated in an area to which the text string 773 or 815 is output. In an embodiment, as illustrated in a fifth state 801, the electronic device may display a shape (or a font), a size, a color, a background color, or the like of the selected at least one character 815a to be different from that of any other unselected character.

According to an embodiment, if the at least one character 815a of the text string 773 or 815 is selected, the electronic device may output an object (e.g., a completion button 817) indicating the completion of character selection to a specific area of the execution screen 730 or 810 of the search application. Furthermore, as illustrated in a sixth state 803, the electronic device may output the selected at least one character 815a or 831 to the text input object 731 or 811 in response to a third user input 821 for selecting the completion button 817.

According to an embodiment, as illustrated in the sixth state 803, if a user input 841 for selecting a search button 833 included in the execution screen 730 or 810 of the search application is generated, the electronic device may perform a search function by using the selected at least one character 815a or 831 that is input as the search word. Moreover, as illustrated in a seventh state 805, the electronic device may output a search result screen 850 to the display.

Figure 9:
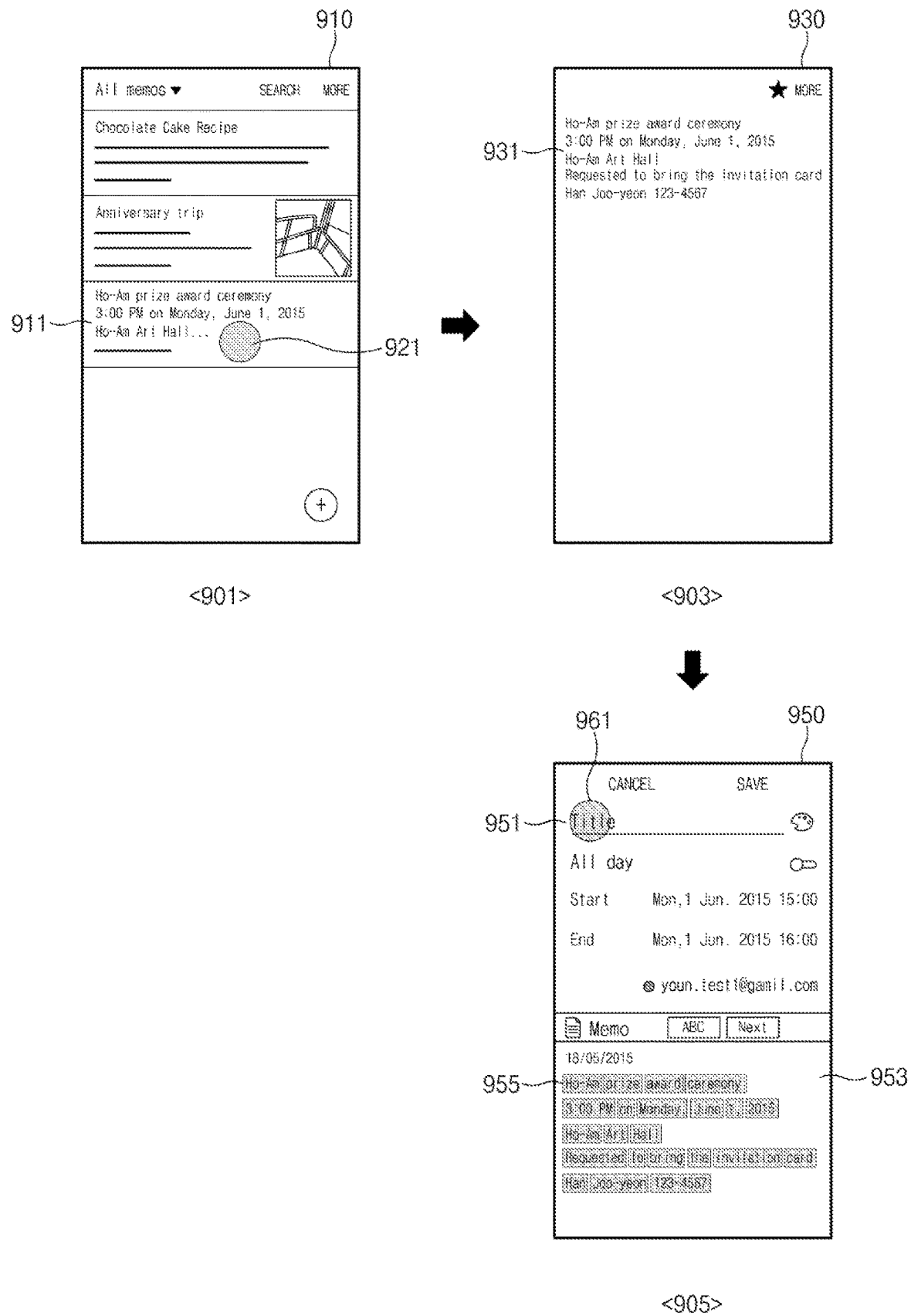
FIGS. 9 and 10 are views for describing a method of inputting a text in a schedule screen by using a text output to a memo screen, according to an embodiment of the present disclosure.
Figure 10:
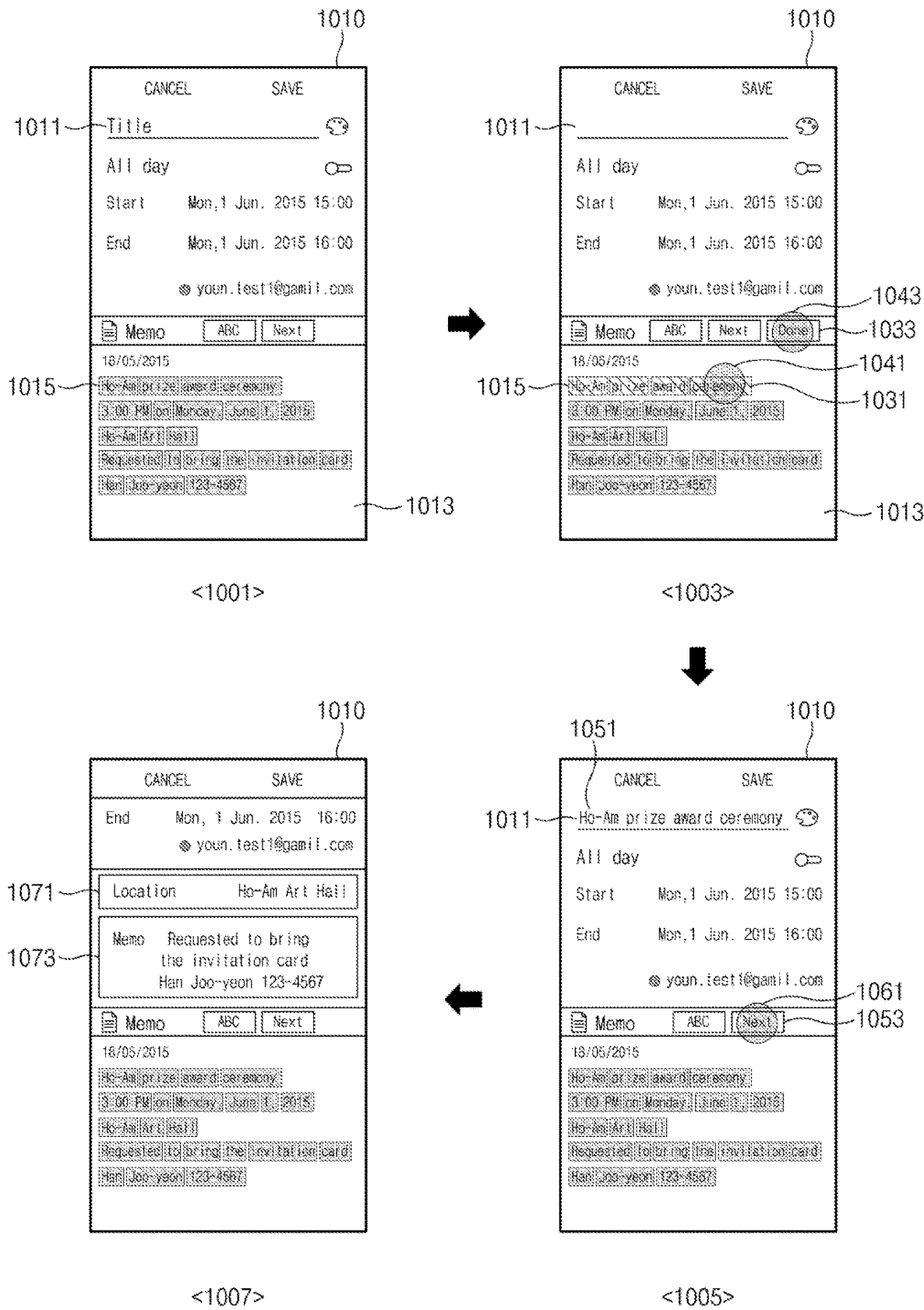

FIGS. 9 and 10 are views for describing a method of inputting a text in a schedule screen by using a text output to a memo screen, according to an embodiment of the present disclosure.

Referring to FIGS. 9 and 10, as illustrated in a first state 901, the electronic device (e.g., the electronic device 100) may output an execution screen 910 of a memo application in a display (e.g., the display 130). The execution screen 910 of the memo application may include a view object corresponding to at least one memo 911 stored in a memory (e.g., the memory 170).

According to an embodiment, if a user input 921 for selecting the view object corresponding to the memo 911 is generated in the first state 901, as illustrated in a second state 903, the electronic device may output a screen 930 including a view object corresponding to details 931 of the selected memo 911 to the display. The screen 930 may be a screen in which one function of functions supported by the memo application is executed.

According to an embodiment, if the screen 930 is deactivated, the electronic device may extract a text string from the view object output to the screen 930. For example, the electronic device may extract the text string from the view object corresponding to the details 931 of the memo 911 output to the screen 930. In addition, the electronic device may store the extracted text string in the memory.

According to an embodiment, as illustrated in a third state 905, the electronic device may output an execution screen 950 or 1010 of a schedule management application to the display. The execution screen 950 or 1010 of the schedule management application may include a text input object 951 or 1011 (e.g., a text field object) for inputting a schedule.

According to an embodiment, if a first user input 961 for selecting the text input object 951 or 1011 included in the execution screen 950 or 1010 of the schedule management application is generated, as illustrated in the third state 905 or a fourth state 1001, the electronic device may output a text string 955 or 1015 stored in the memory to a lower area 953 or 1013 of the execution screen 950 or 1010 of the schedule management application. However, embodiments of the present disclosure are not limited thereto. In an embodiment, the electronic device may output an SIP to the lower area 953 or 1013 of the execution screen 950 or 1010 of the schedule management application in response to the first user input 961. Moreover, the electronic device may end the output of the SIP in response to a user input for selecting a specified button included in the SIP and may output the text string 955 or 1015 stored in the memory to an area to which the SIP has been output.

According to an embodiment, the electronic device may select at least one character 1031 of the text string 955 or 1015 in response to a second user input 1041 generated in an area to which the text string 955 or 1015 is output. In an embodiment, as illustrated in a fifth state 1003, the electronic device may display a shape (or a font), a size, a color, a background color, or the like of the selected at least one character 1031 to be different from that of any other unselected character.

According to an embodiment, if the at least one character 1031 of the text string 955 or 1015 is selected, the electronic device may output an object (e.g., a completion button 1033) indicating the completion of character selection to a specific area of the execution screen 950 or 1010 of the schedule management application. Furthermore, as illustrated in a sixth state 1005, the electronic device may output the selected at least one character 1031 or 1051 to the text input object 951 or 1011 in response to a third user input 1043 for selecting the completion button 1033. Also, the electronic device may output an object (e.g., a next button 1053) to a specific area of the execution screen 950 or 1010 of the schedule management application. Moreover, as illustrated in a seventh state 1007, the electronic device may support a method of identically or similarly inputting a text in another text input object (e.g., a text input object 1071 for designating a place associated with a schedule, a text input object 1073 for writing a memo associated with a schedule, or the like) included in the execution screen 950 or 1010 of the schedule management application in response to a fourth user input 1061 for selecting the next button 1053.

Figure 11:
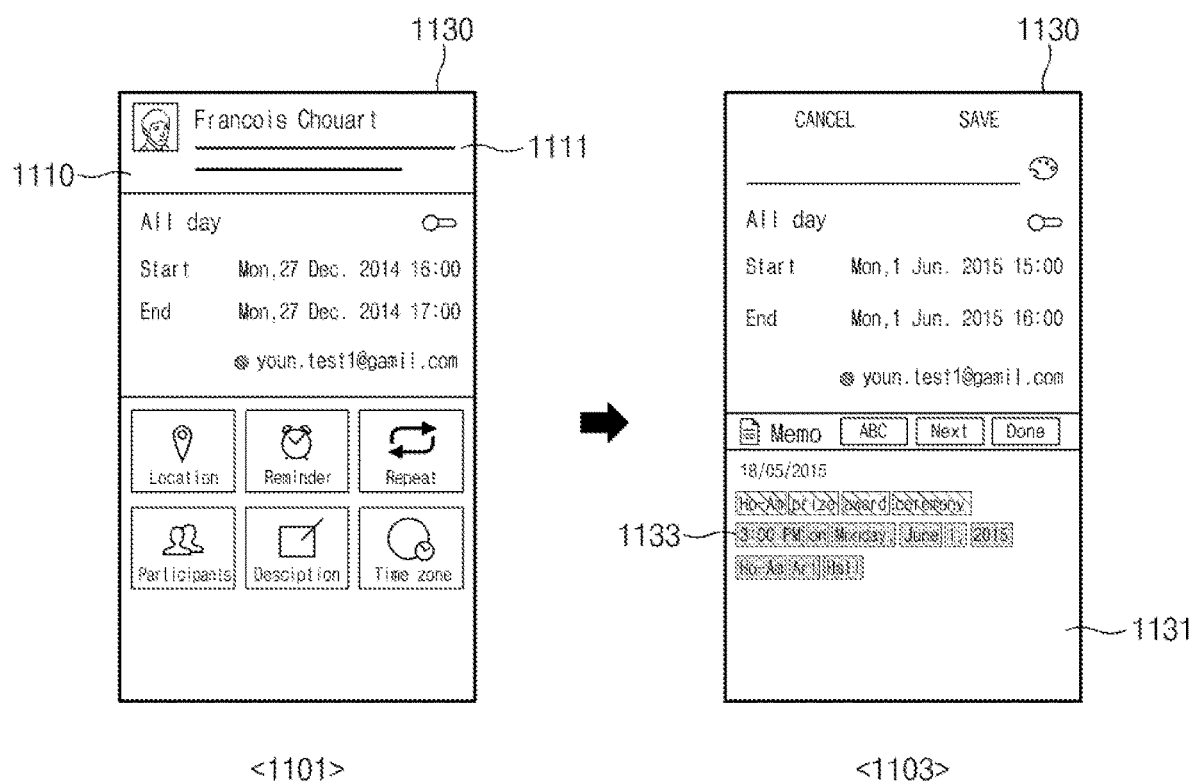
FIG. 11 is a view for describing a method of inputting a text in a schedule screen by using a text output to a notification screen, according to an embodiment of the present disclosure.

FIG. 11 is a view for describing a method of inputting a text in a schedule screen by using a text output to a notification screen, according to an embodiment of the present disclosure.

Referring to FIG. 11, as illustrated in a first state 1101, in a state where the electronic device (e.g., the electronic device 100) outputs an execution screen 1130 of an application (e.g., an execution screen of a schedule management application) to a display (e.g., the display 130), if a notification occurs, the electronic device may output a notification screen 1110 to a specific area (e.g., an upper area) of the display during a specified time. The notification screen 1110 may include a view object 1111 corresponding to a system notification (e.g., a state notification of the remaining storage space of a memory, a state notification of a battery level, or the like), a communication-related notification (e.g., a message receiving notification, a phone receiving notification, or the like), a user setting notification (e.g., a schedule notification or the like), or the like.

According to an embodiment, if the notification screen 1110 is deactivated, the electronic device may extract a text string from the view object 1111 output to the notification screen 1110. In addition, the electronic device may store the extracted text string in a memory (e.g., the memory 170).

According to an embodiment, as illustrated in a second state 1103, the electronic device may output a text string 1133 stored in the memory to a specific area 1131 of the execution screen 1130 of the application in response to a specified user input generated in the execution screen 1130 of the application.

Figure 12:
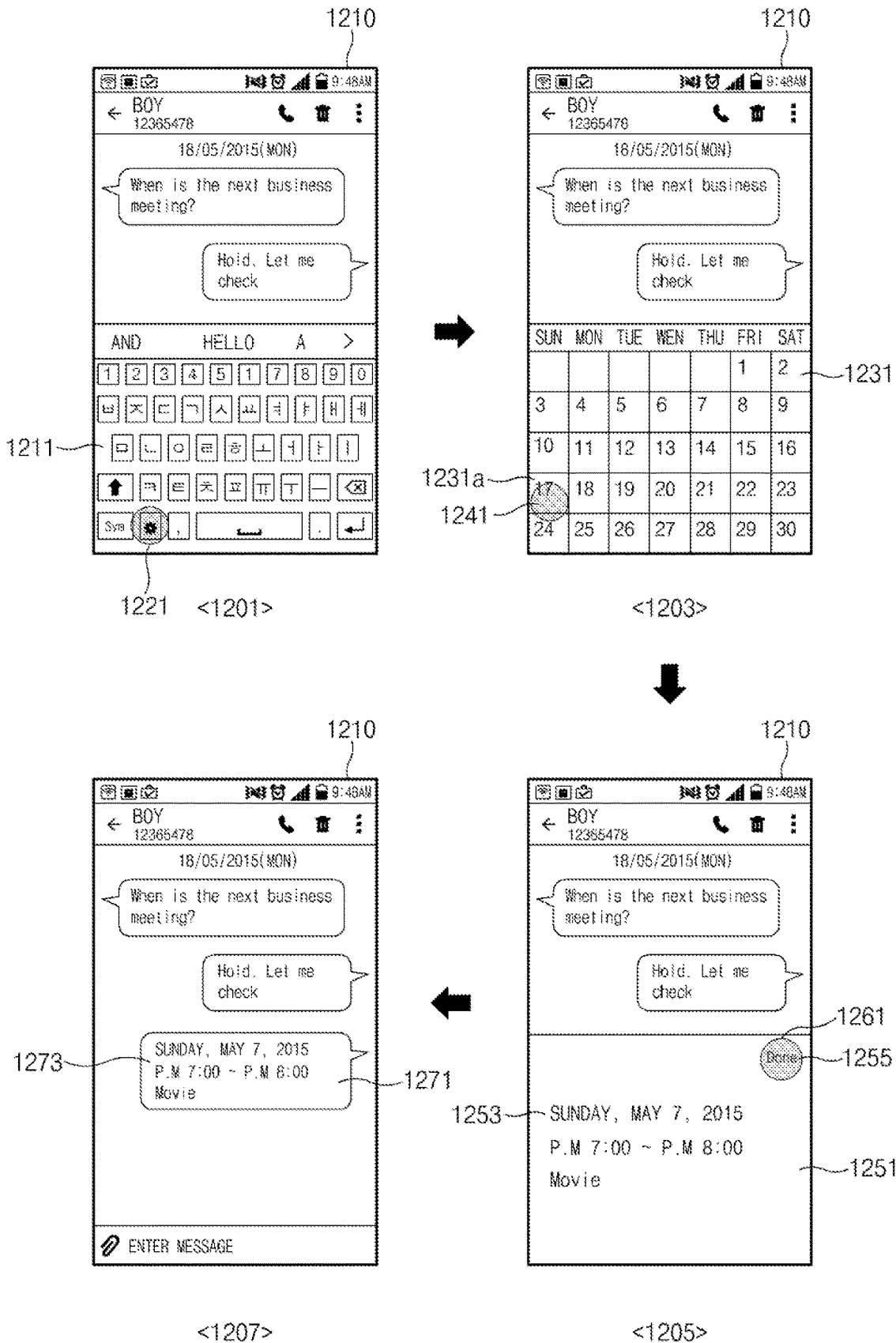
FIG. 12 is a view for describing a text input method through a text-related application, according to an embodiment of the present disclosure.

FIG. 12 is a view for describing a text input method through a text-related application, according to an embodiment of the present disclosure.

Referring to FIG. 12, as illustrated in a first state 1201, an electronic device (e.g., the electronic device 100) may output an execution screen 1210 of an application (e.g., an execution screen of a message application) to a display (e.g., the display 130). In addition, the electronic device may output an SIP 1211 to a specific area of the execution screen 1210 of the application in response to a user input for selecting a text input object included in the execution screen 1210 of the application.

According to an embodiment, the SIP 1211 may include a button for executing a text-related application, for example, an application (e.g., a memo application, a schedule management application, a message application, or the like) for inputting and storing a text. If a user input 1221 for selecting the button is generated, as illustrated in a second state 1203, the electronic device may end the output of the SIP 1211 and may output an execution screen 1231 of the text-related application to an area to which the SIP 1211 has been output.

According to an embodiment, the execution screen 1231 of the text-related application may include a view object corresponding to a text string stored in a memory (e.g., the memory 170) with regard to the text-related application. For example, if the text-related application is a memo application, the execution screen 1231 of the text-related application may include a view object corresponding to a memo stored in the memory. For another example, if the text-related application is a schedule management application, the execution screen 1231 of the text-related application may include a view object corresponding to a schedule stored in the memory. For another example, if the text-related application is a message application, the execution screen 1231 of the text-related application may include a view object corresponding to a sent/received message stored in the memory. An embodiment is exemplified in FIG. 12 as the text-related application is assigned to the schedule management application and the execution screen 1231 of the text-related application includes a view object 1231a corresponding to the schedule stored in the memory. In an embodiment, the electronic device may not display a date other than a date corresponding to the schedule stored in the memory in the display.

According to an embodiment, if a user input 1241 is generated in the execution screen 1231 of the text-related application, the electronic device may extract a text string 1253 from the view object 1231a corresponding to the user input 1241. In addition, as illustrated in a third state 1205, the electronic device may output the extracted text string 1253 to a specific area 1251 of the display, for example, an area to which the execution screen 1231 of the text-related application is output. In an embodiment, the electronic device may further output an object (e.g., a completion button 1255) indicating the completion of character selection.

According to an embodiment, after at least one character of the output text string 1253 is selected, if a user input 1261 for selecting the completion button 1255 is generated, as illustrated in a fourth state 1207, the electronic device may output selected at least one character 1273 to the execution screen 1210 of the application. According to various embodiments, when outputting the selected at least one character 1273, the electronic device may process the selected at least one character 1273 to be different depending on a type of the application. For example, as illustrated in FIG. 12, in the case where the application is a message application, the electronic device may output the selected at least one character 1273 while the selected at least one character 1273 is included in a view object 1271 such as a speech bubble or the like.

Figure 13:
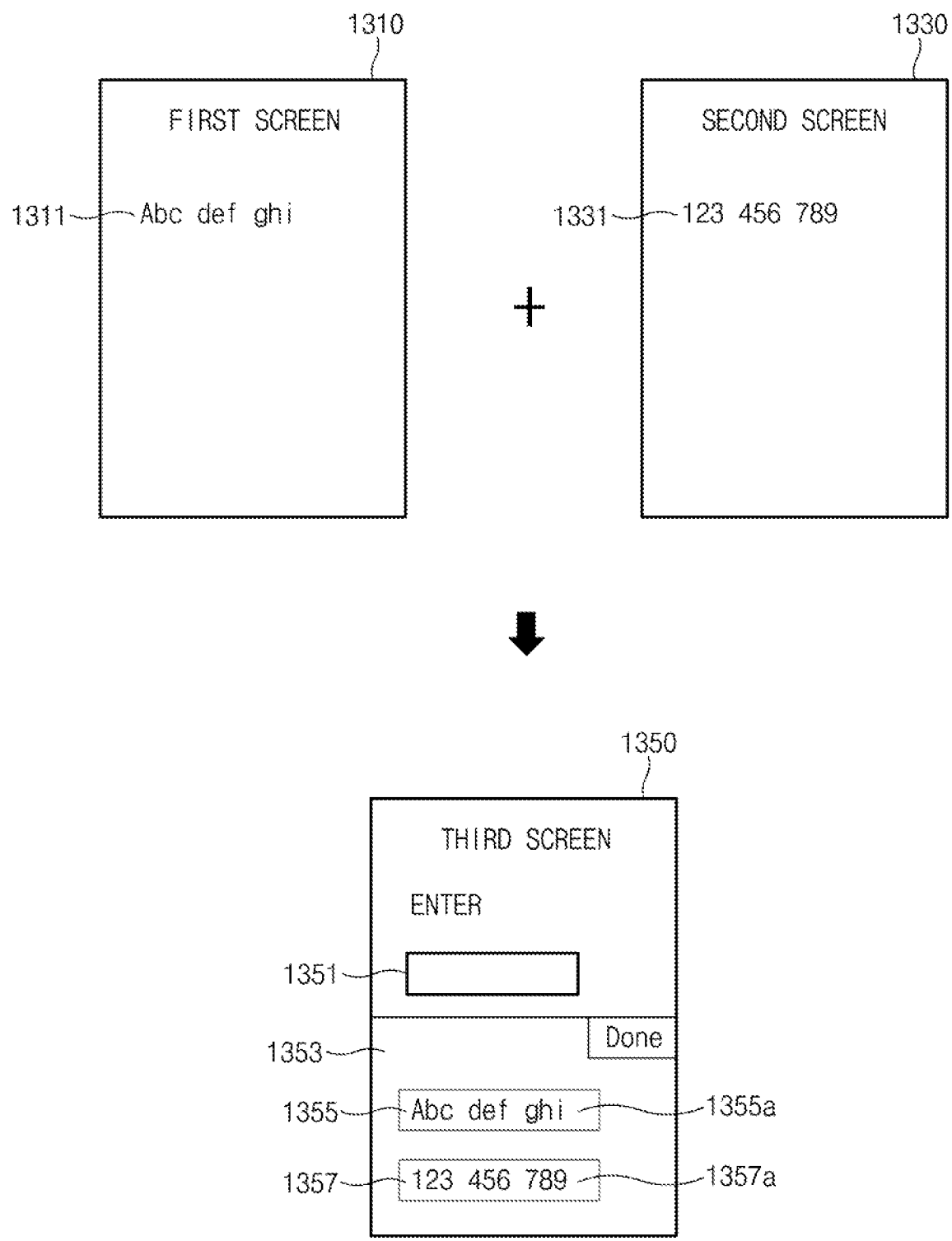
FIG. 13 is a view for describing a method of outputting text strings to a plurality of screens, according to an embodiment of the present disclosure.

FIG. 13 is a view for describing a method of outputting text strings to a plurality of screens, according to an embodiment of the present disclosure.

Referring to FIG. 13, the electronic device (e.g., the electronic device 100) may extract a text string from view objects output to a plurality of screens. For example, the electronic device may extract a first text string 1355a (e.g., "Abc def ghi") from a view object 1311 output to a first screen 1310 and may extract a second text string 1357a (e.g., "123 456 789") from a view object 1331 output to a second screen 1330. According to an embodiment, the first screen 1310 may be a screen that is output before the second screen 1330 is output to a display (e.g., the display 130). In an embodiment, the second screen 1330 may be a screen that is output to the display before a specified condition is satisfied after the first screen 1310 is deactivated. The specified condition may include the case where a specified time elapses after one screen (e.g., the first screen 1310) is deactivated, the case where an application associated with the screen (e.g., the first screen 1310) ends, the case where data associated with the execution of the application is deleted from a memory (e.g., the memory 170) after the application ends (e.g., the case where the application is deleted from a history list of applications), or the like.

According to an embodiment, the electronic device may store a text string extracted with respect to the first screen 1310 and the second screen 1330 in the memory. For example, the electronic device may store the first text string 1355a and the second text string 1357a in the memory. In an embodiment, before the specified condition is satisfied, the electronic device may control the memory to keep a state where the extracted text string is stored in the memory. For example, unless a specified time elapses after the first screen 1310 is deactivated, unless an application associated with the first screen 1310 ends, or unless data associated with the execution of the application is deleted from the memory after the application associated with the first screen 1310 ends, the electronic device may maintain a storage state of the first text string 1355a. Furthermore, unless a specified time elapses after the second screen 1330 is deactivated, unless an application associated with the second screen 1330 ends, or unless data associated with the execution of the application is deleted from the memory after the application associated with the second screen 1330 ends, the electronic device may maintain a storage state of the second text string 1357*a*.

According to an embodiment, the electronic device may correlate the extracted text string with the property of a screen from which the text string is extracted, and may store the correlated result in the memory. For example, the electronic device may correlate the first text string 1355*a* extracted from the view object 1311 of the first screen 1310 with the property of the first screen 1310 to store the correlated result in the memory. The electronic device may correlate the second text string 1357*a* extracted from the view object 1331 of the second screen 1330 with the property of the second screen 1330 to store the correlated result in the memory. For example, the property of the screen may include an identifier (e.g., a package name of the application) of the application associated with the screen, or the like.

According to an embodiment, the electronic device may output a third screen 1350 including a text input object 1351 to the display. Moreover, if a user input for selecting the text input object 1351 is generated, the electronic device may output the text string stored in the memory to a specific area 1353 (e.g., a lower area) of the third screen 1350.

According to an embodiment, in the case where the number of text strings stored in the memory is plural, the electronic device may verify the property of a screen associated with the text string. In the case where the property of the screen is different, the electronic device may distinguish and output the text string for each property of the corresponding screen. An embodiment is exemplified in FIG. 13 as the electronic device processes a background color of an area 1355 in which the first text string 1355*a* is displayed, so as to be different from a background color of an area 1357 in which the second text string 1357*a* is displayed. In an embodiment, the electronic device may sequentially output the first text string 1355*a* and the second text string 1357*a* without distinguishing the display area.

Figure 14:
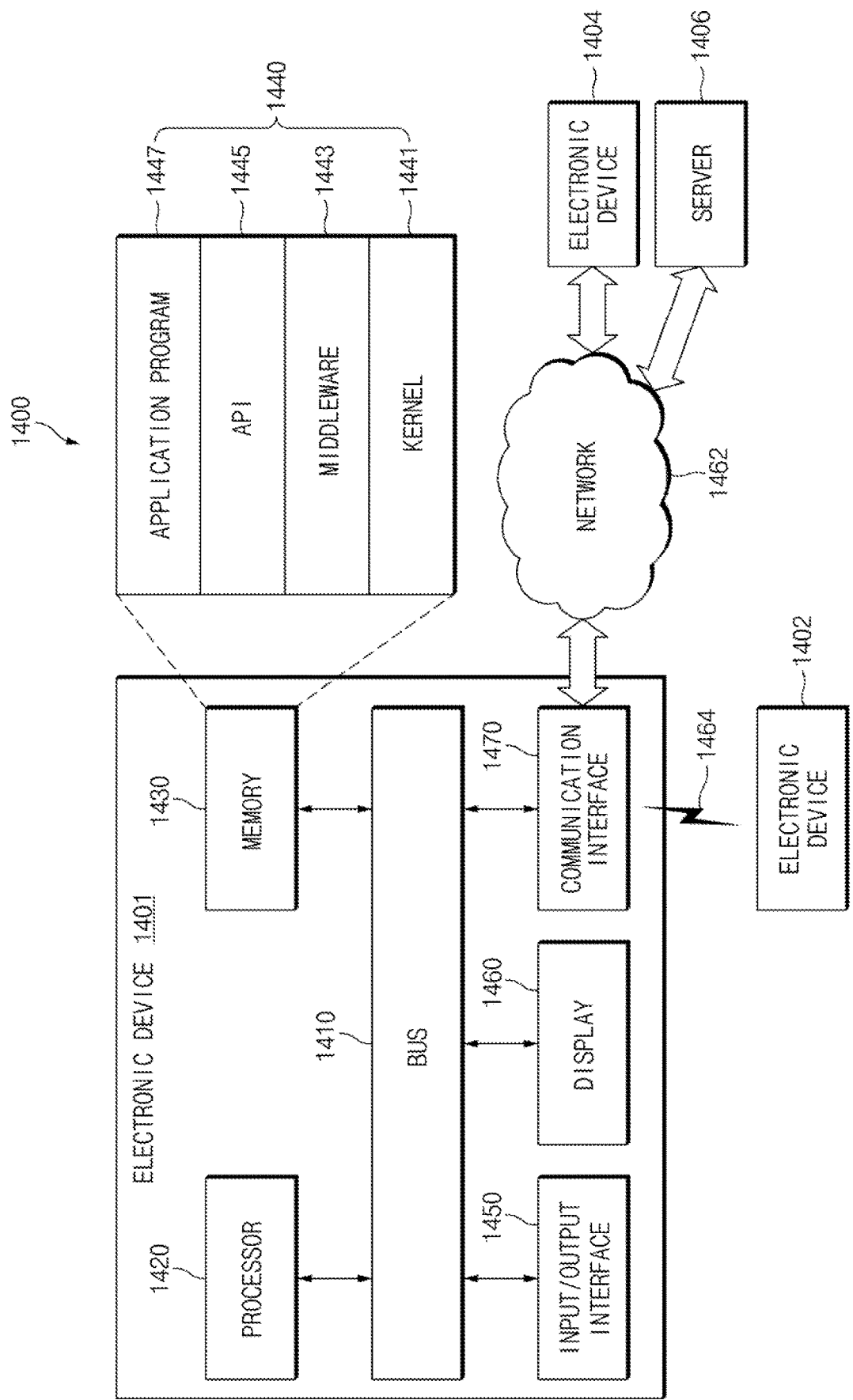
FIG. 14 illustrates an electronic device in a network environment according to an embodiment of the present disclosure.

FIG. 14 illustrates an electronic device in a network environment according to an embodiment of the present disclosure.

Referring to FIG. 14, an electronic device 1401 is provided in a network environment 1400 according to various embodiments of the present disclosure. The electronic device 1401 may include a bus 1410, a processor 1420, a memory 1430, an input/output interface 1450, a display 1460, and a communication interface 1470. In various embodiments of the present disclosure, at least one of the foregoing elements may be omitted or another element may be added to the electronic device 1401.

The bus 1410 may include a circuit for connecting the above-mentioned elements 1410 to 1470 to each other and transferring communications (e.g., control messages and/or data) among the above-mentioned elements.

The processor 1420 may include at least one of a central processing unit (CPU), an application processor (AP), or a communication processor (CP). The processor 1420 may perform data processing or an operation related to communication and/or control of at least one of the other elements of the electronic device 1401.

The memory 1430 may include a volatile memory and/or a nonvolatile memory. The memory 1430 may store instructions or data related to at least one of the other elements of the electronic device 1401. According to an embodiment of the present disclosure, the memory 1430 may store software and/or a program 1440. The program 1440 may include, for example, a kernel 1441, a middleware 1443, an application programming interface (API) 1445, and/or an application program (or an application) 1447. At least a portion of the kernel 1441, the middleware 1443, or the API 1445 may be referred to as an operating system (OS).

The kernel 1441 may control or manage system resources (e.g., the bus 1410, the processor 1420, the memory 1430, or the like) used to perform operations or functions of other programs (e.g., the middleware 1443, the API 1445, or the application program 1447). Furthermore, the kernel 1441 may provide an interface for allowing the middleware 1443, the API 1445, or the application program 1447 to access individual elements of the electronic device 1401 in order to control or manage the system resources.

The middleware 1443 may serve as an intermediary so that the API 1445 or the application program 1447 communicates and exchanges data with the kernel 1441.

Furthermore, the middleware 1443 may handle one or more task requests received from the application program 1447 according to a priority order. For example, the middleware 1443 may assign at least one application program 1447 a priority for using the system resources (e.g., the bus 1410, the processor 1420, the memory 1430, or the like) of the electronic device 1401. For example, the middleware 1443 may handle the one or more task requests according to the priority assigned to the at least one application, thereby performing scheduling or load balancing with respect to the one or more task requests.

The API 1445, which is an interface for allowing the application 1447 to control a function provided by the kernel 1441 or the middleware 1443, may include, for example, at least one interface or function (e.g., instructions) for file control, window control, image processing, character control, or the like.

The input/output interface 1450 may serve to transfer an instruction or data input from a user or another external device to (an)other element(s) of the electronic device 1401. Furthermore, the input/output interface 1450 may output instructions or data received from (an)other element(s) of the electronic device 1401 to the user or another external device.

The display 1460 may include, for example, a liquid crystal display (LCD), a light-emitting diode (LED) display, an organic light-emitting diode (OLED) display, a microelectromechanical systems (MEMS) display, or an electronic paper display. The display 1460 may present various content (e.g., a text, an image, a video, an icon, a symbol, or the like) to the user. The display 1460 may include a touch screen, and may receive a touch, gesture, proximity or hovering input from an electronic pen or a part of a body of the user.

The communication interface 1470 may set communications between the electronic device 1401 and an external device (e.g., a first external electronic device 1402, a second external electronic device 1404, or a server 1406). For example, the communication interface 1470 may be connected to a network 1462 via wireless communications or wired communications so as to communicate with the external device (e.g., the second external electronic device 1404 or the server 1406).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1464. The short-range communications may include at least one of Wi-Fi, Bluetooth (BT), near field communication (NFC), magnetic stripe transmission (MST), or GNSS.

The MST may generate pulses according to transmission data and the pulses may generate electromagnetic signals. The electronic device 1401 may transmit the electromagnetic signals to a reader device such as a point of sales (POS) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1462 may include at least one of telecommunications networks, for example, a computer network (e.g., local area network (LAN) or wide area network (WAN)), the Internet, or a telephone network.

The types of the first external electronic device 1402 and the second external electronic device 1404 may be the same as or different from the type of the electronic device 1401. According to an embodiment of the present disclosure, the server 1406 may include a group of one or more servers. A portion or all of operations performed in the electronic device 1401 may be performed in one or more other electronic devices (e.g., the first electronic device 1402, the second external electronic device 1404, or the server 1406). When the electronic device 1401 should perform a certain function or service automatically or in response to a request, the electronic device 1401 may request at least a portion of functions related to the function or service from another device (e.g., the first electronic device 1402, the second external electronic device 1404, or the server 1406) instead of or in addition to performing the function or service for itself. The other electronic device (e.g., the first electronic device 1402, the second external electronic device 1404, or the server 1406) may perform the requested function or additional function, and may transfer a result of the performance to the electronic device 1401. The electronic device 1401 may use a received result itself or additionally process the received result to provide the requested function or service. To this end, for example, a cloud computing technology, a distributed computing technology, or a client-server computing technology may be used.

Figure 15:
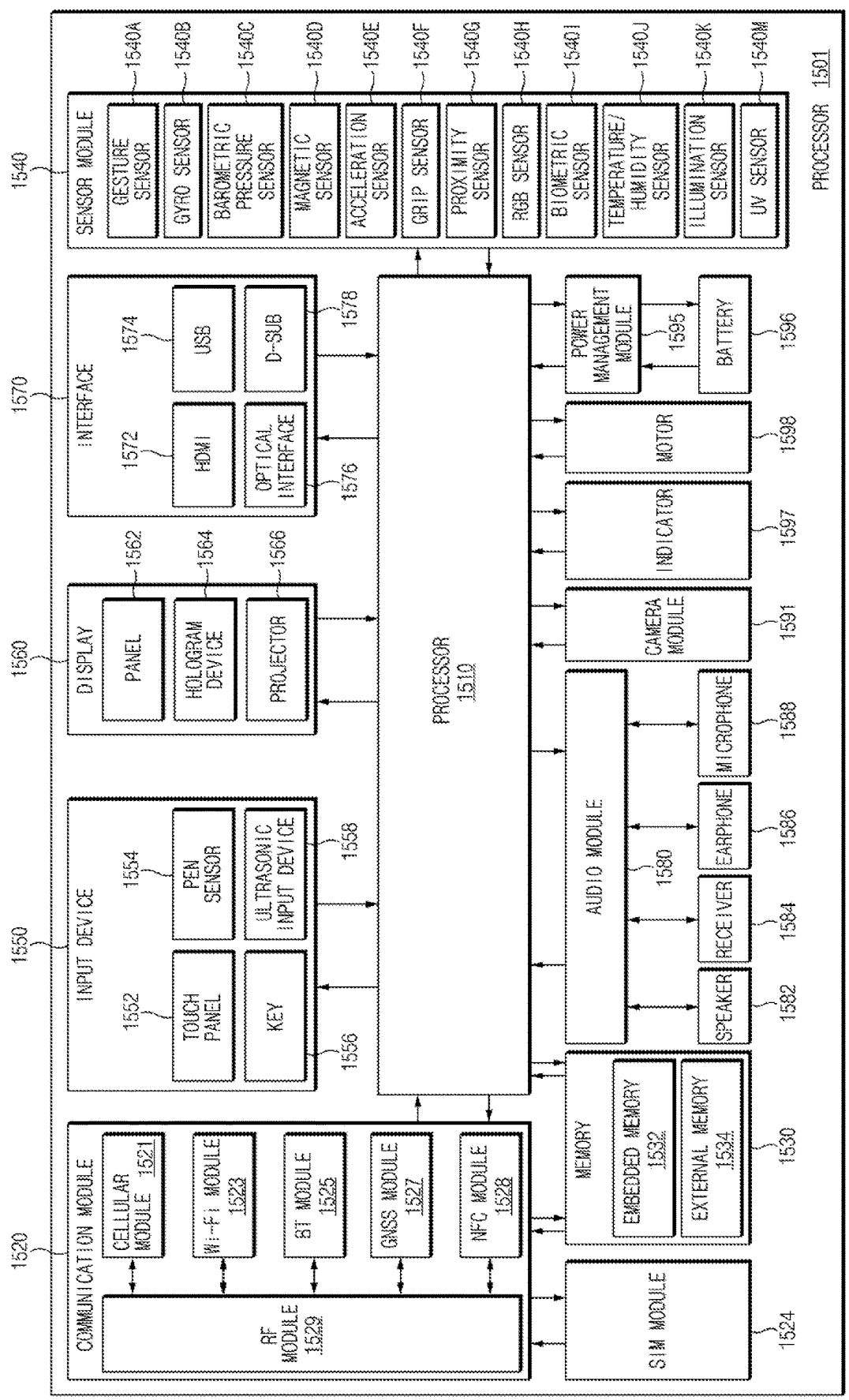
FIG. 15 is a block diagram illustrating an electronic device according to an embodiment of the present disclosure.

FIG. 15 is a block diagram illustrating an electronic device according to an embodiment of the present disclosure.

Referring to FIG. 15, an electronic device 1501 may include, for example, a part or the entirety of the electronic device 1401 illustrated in FIG. 14. The electronic device 1501 may include at least one processor (e.g., AP) 1510, a communication module 1520, a subscriber identification module (SIM) 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may run an operating system or an application program so as to control a plurality of hardware or software elements connected to the processor 1510, and may process various data and perform operations. The processor 1510 may be implemented with, for example, a system on chip (SoC). According to an embodiment of the present disclosure, the processor 1510 may further include a graphic processing unit (GPU) and/or an image signal processor. The processor 1510 may include at least a portion (e.g., a cellular module 1521) of the elements illustrated in FIG. 15. The processor 1510 may load, on a volatile memory, an instruction or data received from at least one of other elements (e.g., a nonvolatile memory) to process the instruction or data, and may store various data in a nonvolatile memory.

The communication module 1520 may have a configuration that is the same as or similar to that of the communication interface 1470 of FIG. 14. The communication module 1520 may include, for example, the cellular module 1521, a Wi-Fi module 1523, a BT module 1525, a GNSS module 1527 (e.g., a GPS module, a GLONASS module, a BeiDou module, or a Galileo module), a NFC module 1528, and a radio frequency (RF) module 1529.

The cellular module 1521 may provide, for example, a voice call service, a video call service, a text message service, or an Internet service through a communication network. The cellular module 1521 may identify and authenticate the electronic device 1501 in the communication network using the subscriber identification module 1524 (e.g., a SIM card). The cellular module 1521 may perform at least a part of functions that may be provided by the processor 1510. The cellular module 1521 may include a communication processor (CP).

Each of the Wi-Fi module 1523, the BT module 1525, the GNSS module 1527 and the NFC module 1528 may include, for example, a processor for processing data transmitted/received through the modules. According to some various embodiments of the present disclosure, at least a part (e.g., two or more) of the cellular module 1521, the Wi-Fi module 1523, the BT module 1525, the GNSS module 1527, and the NFC module 1528 may be included in a single integrated chip (IC) or IC package.

The RF module 1529 may transmit/receive, for example, communication signals (e.g., RF signals). The RF module 1529 may include, for example, a transceiver, a power amp module (PAM), a frequency filter, a low noise amplifier (LNA), an antenna, or the like. According to another embodiment of the present disclosure, at least one of the cellular module 1521, the Wi-Fi module 1523, the BT module 1525, the GNSS module 1527, or the NFC module 1528 may transmit/receive RF signals through a separate RF module.

The SIM 1524 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1530 (e.g., the memory 1430) may include, for example, an internal memory 1532 or an external memory 1534. The internal memory 1532 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1534 may include a flash drive such as a compact flash (CF), a secure digital (SD), a Micro-SD, a Mini-SD, an extreme digital (xD), a multi-media card (MMC), a memory stick, or the like. The external memory 1534 may be operatively and/or physically connected to the electronic device 1501 through various interfaces.

The sensor module 1540 may, for example, measure physical quantity or detect an operation state of the electronic device 1501 so as to convert measured or detected information into an electrical signal. The sensor module 1540 may include, for example, at least one of a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color sensor 1540H (e.g., a red/green/blue (RGB) sensor), a biometric sensor 1540I, a temperature/humidity sensor 1540J, an illumination sensor 1540K, or an ultraviolet (UV) sensor 1540M. Additionally or alternatively, the sensor module 1540 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1540 may further include a control circuit for controlling at least one sensor included therein. In some various embodiments of the present disclosure, the electronic device 1501 may further include a processor configured to control the sensor module 1540 as a part of the processor 1510 or separately, so that the sensor module 1540 is controlled while the processor 1510 is in a sleep state.

The input device 1550 may include, for example, a touch panel 1552, a (digital) pen sensor 1554, a key 1556, or an ultrasonic input device 1558. The touch panel 1552 may employ at least one of capacitive, resistive, infrared, and ultraviolet sensing methods. The touch panel 1552 may further include a control circuit. The touch panel 1552 may further include a tactile layer so as to provide a haptic feedback to a user.

The (digital) pen sensor 1554 may include, for example, a sheet for recognition which is a part of a touch panel or is separate. The key 1556 may include, for example, a physical button, an optical button, or a keypad. The ultrasonic input device 1558 may sense ultrasonic waves generated by an input tool through a microphone 1588 so as to identify data corresponding to the ultrasonic waves sensed.

The display 1560 (e.g., the display 1460) may include a panel 1562, a hologram device 1564, or a projector 1566. The panel 1562 may have a configuration that is the same as or similar to that of the display 1460 of FIG. 14. The panel 1562 may be, for example, flexible, transparent, or wearable. The panel 1562 and the touch panel 1552 may be integrated into a single module. The hologram device 1564 may display a stereoscopic image in a space using a light interference phenomenon. The projector 1566 may project light onto a screen so as to display an image. The screen may be disposed in the inside or the outside of the electronic device 1501. According to an embodiment of the present disclosure, the display 1560 may further include a control circuit for controlling the panel 1562, the hologram device 1564, or the projector 1566.

The interface 1570 may include, for example, an HDMI 1572, a USB 1574, an optical interface 1576, or a D-sub-miniature (D-sub) 1578. The interface 1570, for example, may be included in the communication interface 1470 illustrated in FIG. 14. Additionally or alternatively, the interface 1570 may include, for example, a mobile high-definition link (MHL) interface, an SD card/MMC interface, or an infrared data association (IrDA) interface.

The audio module 1580 may convert, for example, a sound into an electrical signal or vice versa. At least a portion of elements of the audio module 1580 may be included in the input/output interface 1450 illustrated in FIG. 14. The audio module 1580 may process sound information input or output through a speaker 1582, a receiver 1584, an earphone 1586, or the microphone 1588.

The camera module 1591 is, for example, a device for shooting a still image or a video. According to an embodiment of the present disclosure, the camera module 1591 may include at least one image sensor (e.g., a front sensor or a rear sensor), a lens, an image signal processor (ISP), or a flash (e.g., an LED or a xenon lamp).

The power management module 1595 may manage power of the electronic device 1501. According to an embodiment of the present disclosure, the power management module 1595 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1596 and a voltage, current or temperature thereof while the battery is charged. The battery 1596 may include, for example, a rechargeable battery and/or a solar battery.

The indicator 1597 may display a specific state of the electronic device 1501 or a part thereof (e.g., the processor 1510), such as a booting state, a message state, a charging state, or the like. The motor 1598 may convert an electrical signal into a mechanical vibration, and may generate a vibration or haptic effect. Although not illustrated, a processing device (e.g., a GPU) for supporting a mobile TV may be included in the electronic device 1501. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 16:
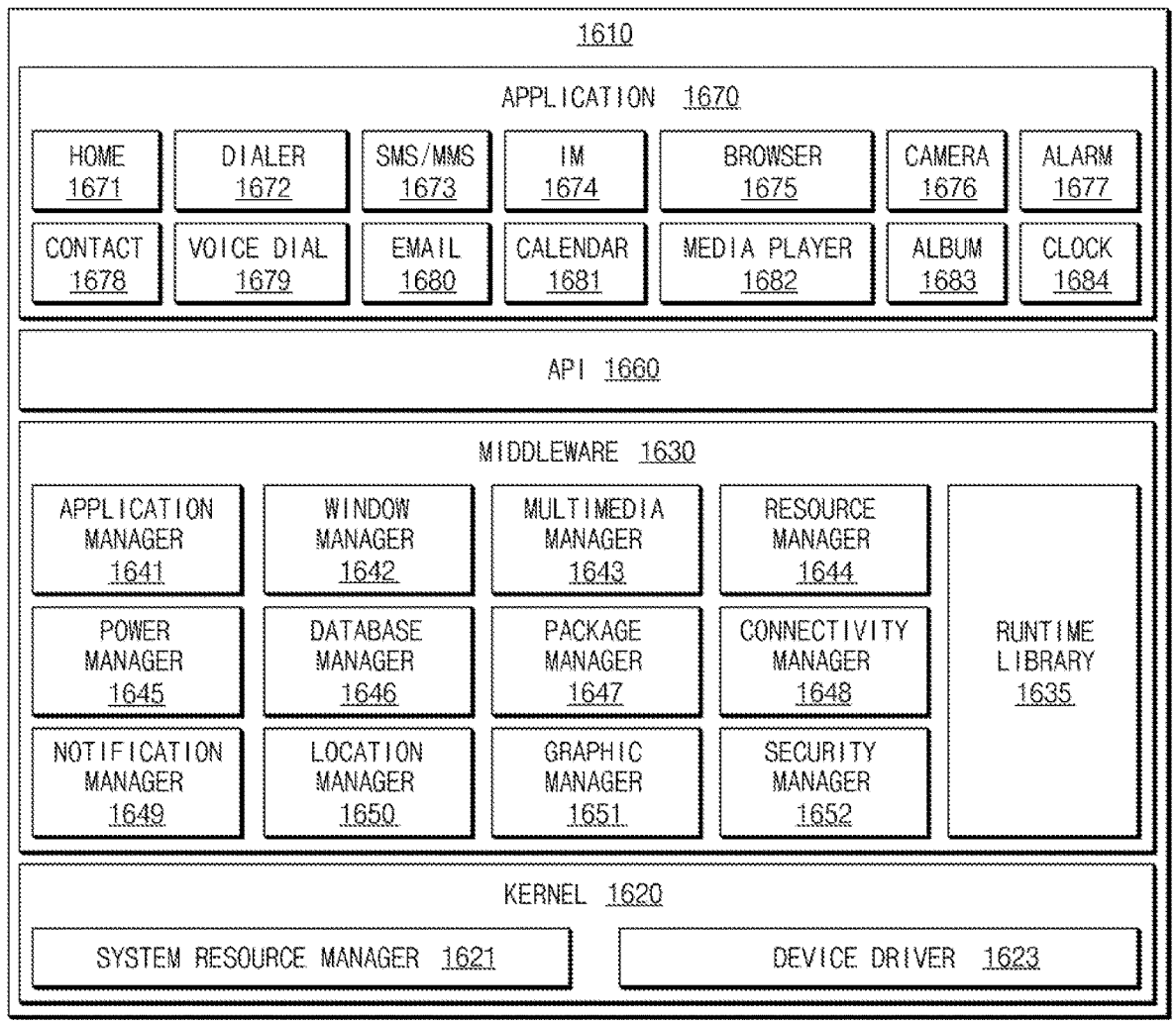
FIG. 16 is a block diagram illustrating a program module according to an embodiment of the present disclosure.

FIG. 16 is a block diagram illustrating a program module according to an embodiment of the present disclosure.

Referring to FIG. 16, a program module 1610 (e.g., the program 1440) may include an OS for controlling a resource related to an electronic device (e.g., the electronic device 1401) and/or various applications (e.g., the application program 1447) running on the OS. The operating system may be, for example, Android™, iOS™ Windows™, Symbian™, Tizen™, or the like.

The program module 1610 may include a kernel 1620, a middleware 1630, an API 1660, and/or an application 1670.

At least a part of the program module 1610 may be preloaded on an electronic device or may be downloaded from an external electronic device (e.g., the first electronic device 1402, the second external electronic device 1404, or the server 1406).

The kernel 1620 (e.g., the kernel 1441) may include, for example, a system resource manager 1621 or a device driver 1623. The system resource manager 1621 may perform control, allocation, or retrieval of a system resource. According to an embodiment of the present disclosure, the system resource manager 1621 may include a process management unit, a memory management unit, a file system management unit, or the like. The device driver 1623 may include, for example, a display driver, a camera driver, a BT driver, a shared memory driver, a USB driver, a keypad driver, a Wi-Fi driver, an audio driver, or an inter-process communication (IPC) driver.

The middleware 1630, for example, may provide a function that the applications 1670 require in common, or may provide various functions to the applications 1670 through the API 1660 so that the applications 1670 may efficiently use limited system resources in the electronic device. According to an embodiment of the present disclosure, the middleware 1630 (e.g., the middleware 1443) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, and a security manager 1652.

The runtime library 1635 may include, for example, a library module that a complier uses to add a new function through a programming language while the application 1670 is running. The runtime library 1635 may perform a function for input/output management, memory management, or an arithmetic function.

The application manager 1641 may mange, for example, a life cycle of at least one of the applications 1670. The window manager 1642 may manage a GUI resource used in a screen. The multimedia manager 1643 may recognize a format required for playing various media files and may encode or decode a media file using a codec matched to the format. The resource manager 1644 may manage a resource such as a source code, a memory, or a storage space of at least one of the applications 1670.

The power manager 1645, for example, may operate together with a basic input/output system (BIOS) to manage a battery or power and may provide power information required for operating the electronic device. The database manager 1646 may generate, search, or modify a database to be used in at least one of the applications 1670. The package manager 1647 may manage installation or update of an application distributed in a package file format.

The connectivity manger 1648 may manage wireless connection of Wi-Fi, BT, or the like. The notification manager 1649 may display or notify an event such as message arrival, appointments, and proximity alerts in such a manner as not to disturb a user. The location manager 1650 may manage location information of the electronic device. The graphic manager 1651 may manage a graphic effect to be provided to a user or a user interface related thereto. The security manager 1652 may provide various security functions required for system security or user authentication. According to an embodiment of the present disclosure, in the case in which an electronic device (e.g., the electronic device 1401) includes a phone function, the middleware 1630 may further include a telephony manager for managing a voice or video call function of the electronic device.

The middleware 1630 may include a middleware module for forming a combination of various functions of the above-mentioned elements. The middleware 1630 may provide a module specialized for each type of an operating system to provide differentiated functions. Furthermore, the middleware 1630 may delete a part of existing elements or may add new elements dynamically.

The API 1660 (e.g., the API 1445) which is, for example, a set of API programming functions may be provided in different configurations according to an operating system. For example, in the case of Android™ or iOS™, one API set may be provided for each platform, and, in the case of Tizen™, at least two API sets may be provided for each platform.

The application 1670 (e.g., the application program 1447), for example, may include at least one application capable of performing functions such as a home 1671, a dialer 1672, an SMS/MMS 1673, an instant message (IM) 1674, a browser 1675, a camera 1676, an alarm 1677, a contact 1678, a voice dial 1679, an e-mail 1680, a calendar 1681, a media player 1682, an album 1683, a clock 1684, health care (e.g., measure an exercise amount or blood sugar), or environmental information provision (e.g., provide air pressure, humidity, or temperature information).

According to an embodiment of the present disclosure, the application 1670 may include an information exchange application for supporting information exchange between the electronic device (e.g., the electronic device 1401) and an external electronic device (e.g., the first electronic device 1402 or the second external electronic device 1404). The information exchange application may include, for example, a notification relay application for relaying specific information to the external electronic device or a device management application for managing the external electronic device.

For example, the notification relay application may have a function for relaying, to an external electronic device (e.g., the first electronic device 1402 or the second external electronic device 1404), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1402 or the second external electronic device 1404) communicating with the electronic device, an application running in the external electronic device, or a service (e.g., a call service, a message service, or the like) provided from the external electronic device.

According to an embodiment of the present disclosure, the application 1670 may include a specified application (e.g., a healthcare application of a mobile medical device) according to an attribute of the external electronic device (e.g., the first electronic device 1402 or the second external electronic device 1404). The application 1670 may include an application received from an external electronic device (e.g., the first electronic device 1402 or the second external electronic device 1404). The application 1670 may include a preloaded application or a third-party application downloadable from a server. The names of the elements of the program module 1610 illustrated may vary with the type of an operating system.

According to various embodiments of the present disclosure, at least a part of the program module 1610 may be implemented with software, firmware, hardware, or a combination thereof. At least a part of the program module 1610, for example, may be implemented (e.g., executed) by a processor (e.g., the processor 1510). At least a part of the program module 1610 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1420), the processor may perform functions corresponding to the instructions. The computer-readable storage medium may be, for example, the memory 1430.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    an input interface configured to receive a user input;
    a memory configured to store a first application and a second application;
    a display configured to display a first screen associated with the first application and a second screen associated with the second application; and
    a processor operatively connected with the input interface, the memory, and the display,
    wherein the processor is configured to:
        in response to a first user input for deactivating the first screen, extract a text string, which is displayed on the first screen, from a first view object displayed on the first screen,
        store the extracted text string in the memory,
        in response to a second user input for inputting a text in the second screen displayed on the display, control the display to display the text string, which is stored in the memory, on a first area of the second screen,
        select at least one text character of the text string, in response to a third user input on the at least one text character of the text string displayed on the first area, and
        control the display to display the selected at least one text character to a second area of the second screen different from the first area, in response to the third user input.

2. The electronic device of claim 1, wherein the extracting of the text string comprises:
    obtaining a view property of the first view object, and
    extracting the text string from the first view object based on the view property.

3. The electronic device of claim 1, wherein the processor is further configured to:
    control the display to display a soft input panel for inputting text to a third area of the second screen, in response to the second user input.

4. The electronic device of claim 3, wherein the processor is further configured to:
    when a specified button included in the soft input panel is selected, end display of the soft input panel, and
    control the display to display the text string to the third area.

5. The electronic device of claim 3, wherein the processor is further configured to:
    when a specified button included in the soft input panel is selected, control the display to end display of the soft input panel, and
    control the display to display the second screen including a second view object corresponding to the text string to the third area.

6. The electronic device of claim 5, wherein the processor is further configured to:
    when the second view object is selected, extract the text string from the second view object,
    end the second screen including the second view object, and
    control the display to display the extracted text string to the third area.

7. The electronic device of claim 1, wherein controlling of the display to display the selected at least one text character comprises:
    controlling the display to display the selected at least one text character, in response to a fourth user input.

8. The electronic device of claim 1, wherein the processor is further configured to:

when at least one of a specified time elapses after the first screen is deactivated, the first application associated with the first screen ends, or data associated with an execution of the first application associated with the first screen is deleted from the memory after the first application associated with the first screen ends, delete the text string from the memory.

9. The electronic device of claim 1, wherein the processor is further configured to:
wherein displaying the selected at least one text character comprises controlling the display to display at least one of a shape, a size, a color, or a background color of the selected at least one text character to be different from a shape, a size, a color, or a background color of another unselected text character.

10. The electronic device of claim 1, wherein the processor is further configured to:
in a state where the at least one text character of the text string is selected, deselect the selected at least one text character, in response to a fourth user input generated in the first area, and
control the display to end display of the deselected at least one text character in the second area.

11. The electronic device of claim 1, wherein the third user input is a single touch input on the at least one text character of the text string.

12. The electronic device of claim 1, wherein the processor is further configured to:
in response to the first user input for deactivating the first screen, transit from the first screen to the second screen.

13. The electronic device of claim 1, wherein the processor is further configured to:
in response to the first user input for deactivating the first screen, end an output of the first screen.

14. A text input method of an electronic device, the method comprising:
in response to a first user input for deactivating a first screen, extracting a text string, which is displayed on the first screen associated with a first application, from a first view object displayed on the first screen;
storing the text string in a memory;
in response to a second user input for inputting a text in a second screen associated with a second application displayed on the display, displaying the text string, which is stored in the memory, on a first area of the second screen;
selecting at least one text character of the text string, in response to a third user input on the at least one text character of the text string displayed on the first area; and
displaying the selected at least one text character to a second area of the second screen different from the first area, in response to the third user input.

15. The method of claim 14, further comprising:
obtaining a view property of the first view object; and
extracting the text string from the first view object based on the view property.

16. The method of claim 14, further comprising:
displaying a soft input panel for inputting text to a third area of the second screen, in response to the second user input.

17. The method of claim 16, further comprising:
when a specified button included in the soft input panel is selected, ending display of the soft input panel; and
displaying the text string to the third area.

18. The method of claim 16, further comprising:
when a specified button included in the soft input panel is selected, ending display of the soft input panel; and
displaying the second screen including a second view object corresponding to the text string to the third area.

19. The method of claim 18, further comprising:
when the second view object is selected, extracting the text string from the second view object;
ending the second screen including the second view object; and
displaying the extracted text string to the third area.

20. The method of claim 18, further comprising:
displaying the selected at least one text character, in response to a fourth user input.

21. The method of claim 14, further comprising:
when at least one of a specified time elapses after the first screen is deactivated, the first application associated with the first screen ends, or data associated with an execution of the first application associated with the first screen is deleted from the memory after the first application associated with the first screen ends, deleting the text string from the memory.

22. The method of claim 14, further comprising:
displaying at least one of a shape, a size, a color, or a background color of the selected at least one text character to be different from a shape, a size, a color, or a background color of another unselected text character.

23. The method of claim 14, further comprising:
in a state where the at least one text character of the text string is selected, deselecting the selected at least one text character, in response to a fourth user input generated in the first area; and
ending display of the deselected at least one text character in the second area.

* * * * *